(12) United States Patent
Fukami et al.

(10) Patent No.: US 6,914,644 B2
(45) Date of Patent: Jul. 5, 2005

(54) LIQUID CRYSTAL DEVICE

(75) Inventors: Tetsuo Fukami, Neyagawa (JP); Katsuhiko Kumagawa, Neyagawa (JP); Masanori Kimura, Daito (JP); Satoshi Asada, Kanazawa (JP); Yoneharu Takubo, Kanazawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 220 days.

(21) Appl. No.: 09/914,232

(22) PCT Filed: Dec. 20, 2000

(86) PCT No.: PCT/JP00/09065

§ 371 (c)(1), (2), (4) Date: Aug. 24, 2001

(87) PCT Pub. No.: WO01/48546

PCT Pub. Date: Jul. 5, 2001

(65) Prior Publication Data

US 2002/0158997 A1 Oct. 31, 2002

(30) Foreign Application Priority Data

Dec. 24, 1999 (JP) ............................................ 11-367172
Jan. 13, 2000 (JP) ............................................ 2000-4279

(51) Int. Cl.[7] ....................... G02F 1/136; G02F 1/1333; G02F 1/1343
(52) U.S. Cl. ........................... 349/42; 349/90; 349/139; 349/143
(58) Field of Search ................................. 349/143, 139, 349/42; 345/90

(56) References Cited

FOREIGN PATENT DOCUMENTS

| EP | 0 453 324 A2 | 10/1991 |
|----|--------------|---------|
| JP | 04-223428 | 12/1990 |
| JP | 07-064115 | 8/1993 |
| JP | 07-318901 | 5/1994 |
| JP | 08-022033 | 7/1994 |
| JP | 08-328038 | 6/1995 |
| JP | 08-240811 | 3/1996 |
| WO | WO 96/00926 | 6/1995 |

*Primary Examiner*—Long Pham
*Assistant Examiner*—Shrinivas Rao
(74) *Attorney, Agent, or Firm*—Parkhurst & Wendel, L.L.P.

(57) ABSTRACT

In a liquid crystal panel in which pseudo dot inversion driving is performed, the occurrence of flicker or vertical and horizontal strings is prevented by preventing an alignment shift between individual layers during the fabrication of a TFT array from producing a difference between the respective abilities of thin-film TFTs to charge adjacent pixels (61, 62). For this purpose, the liquid crystal display panel is constructed such that two TFTs which are enclosed by two adjacent image signal lines (21, 22) and scan signal lines (3) and adjacent to each other along the signal lines (21, 22) have respective source electrodes (71, 72) adjacent to the different image signal lines (21, 22). The source electrodes (71, 72) and drain electrodes (81, 82) of the two TFTs connected to the adjacent pixels (61, 62) are alternately arranged such that variations caused by the alignment shift in the sizes and areas of overlapping portions between the individual layers of the TFTs are equal or the same.

4 Claims, 26 Drawing Sheets

Fig. 2
(1)
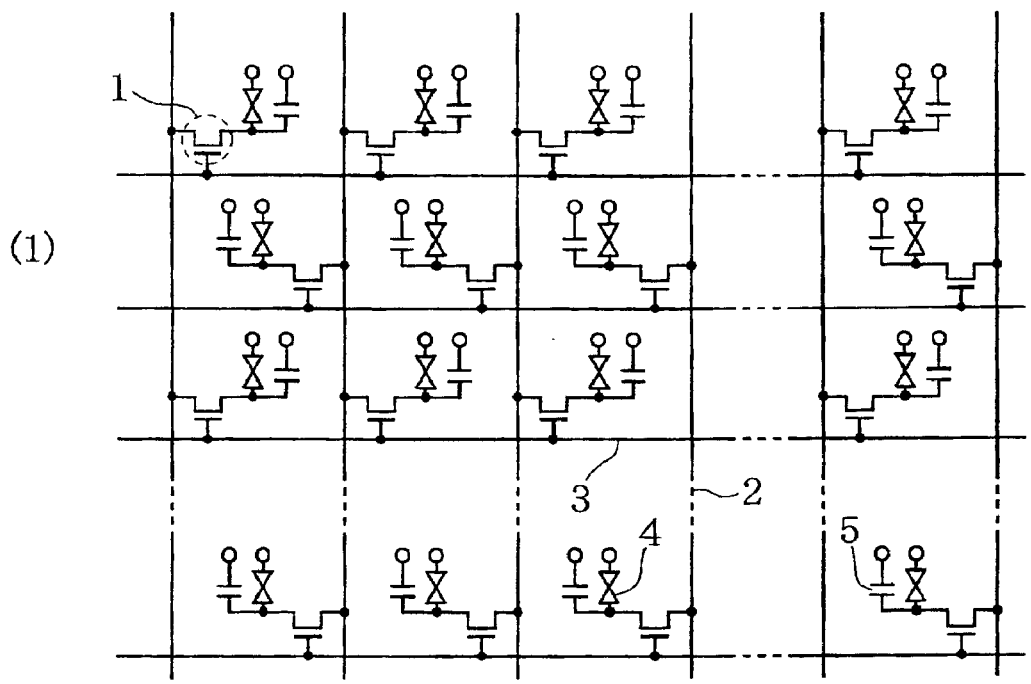
(2)
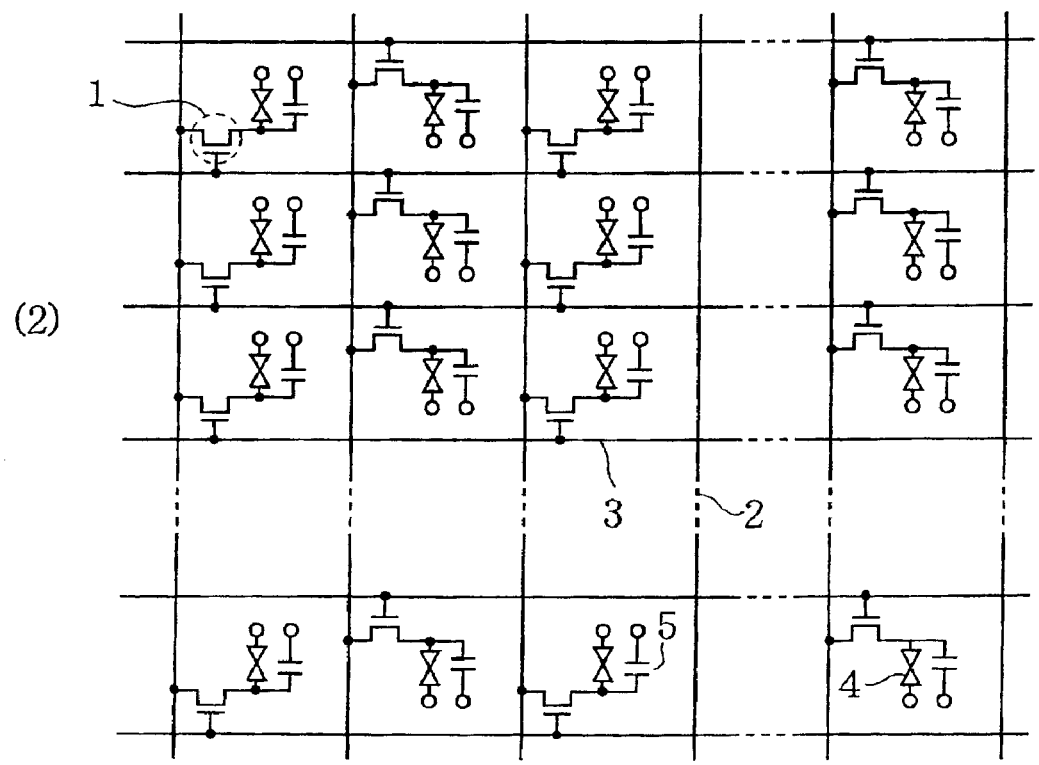

Fig. 6
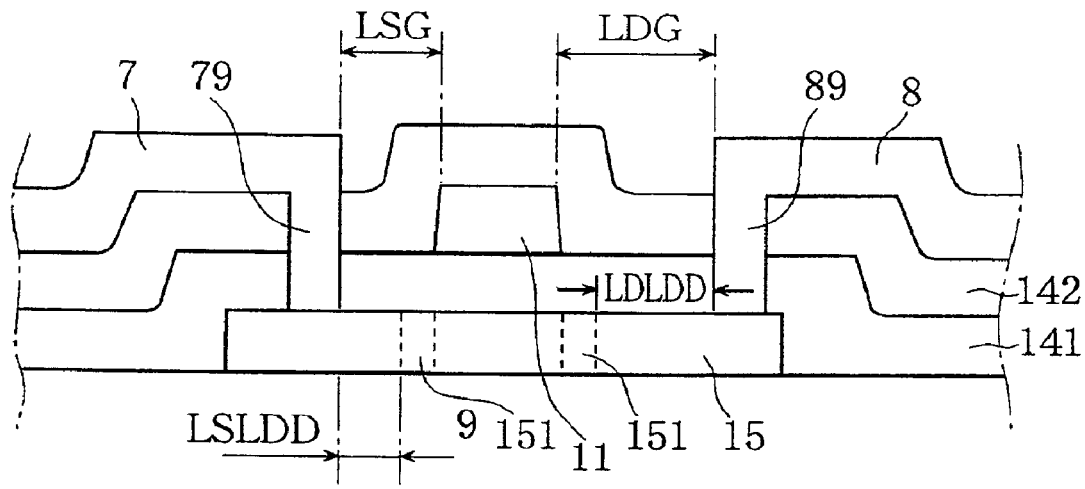
(1)
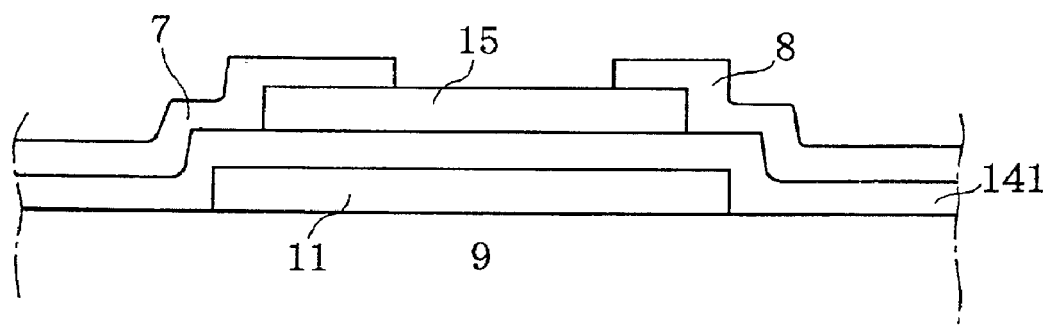
(2)
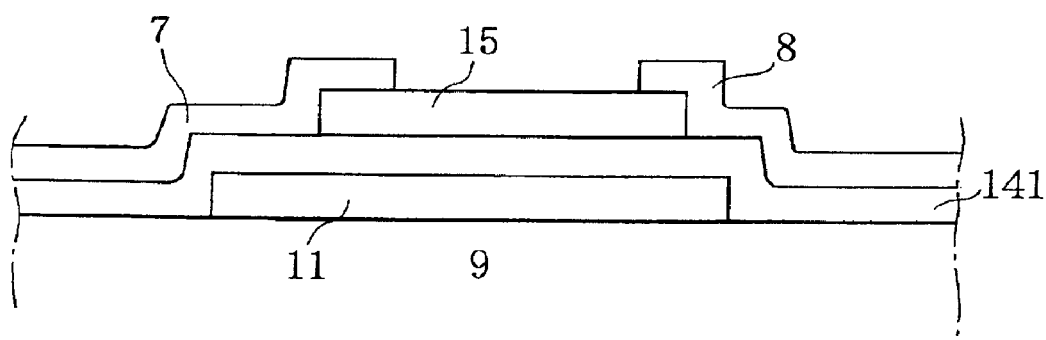
(3)

Fig. 7
(1)
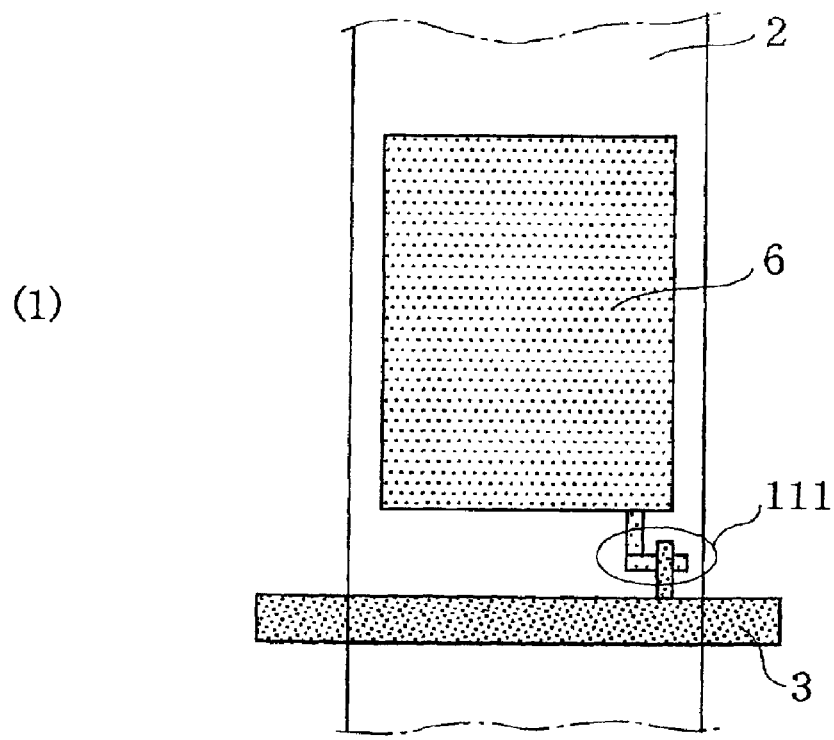
(2)
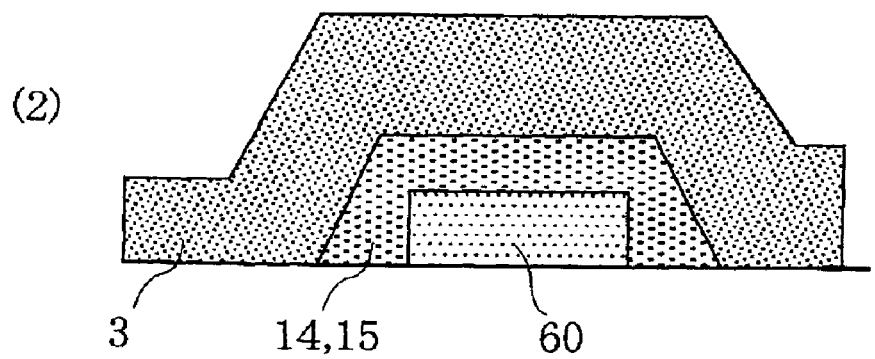
(3)
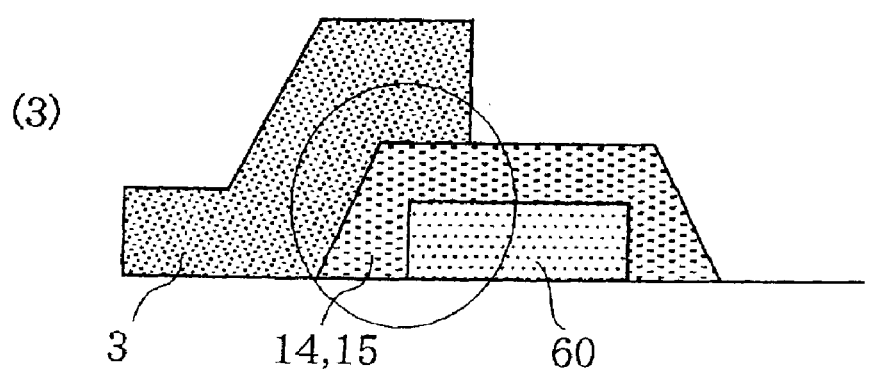

Fig. 17
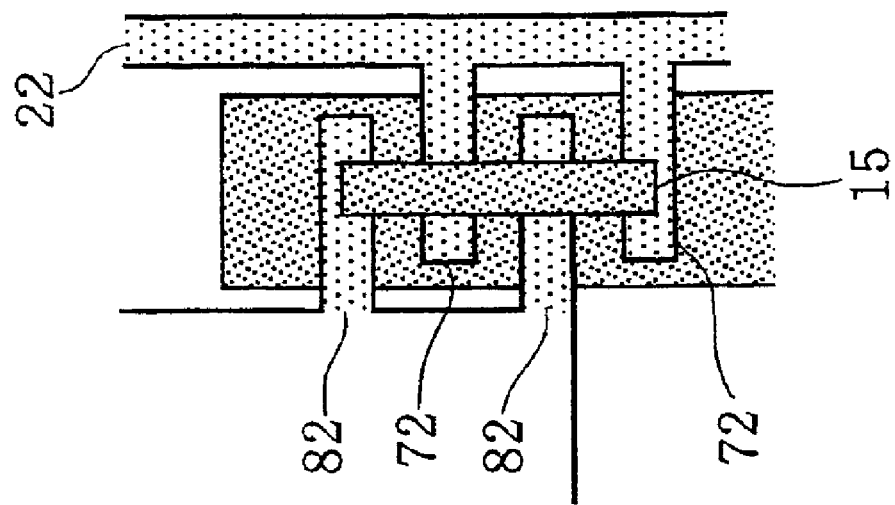
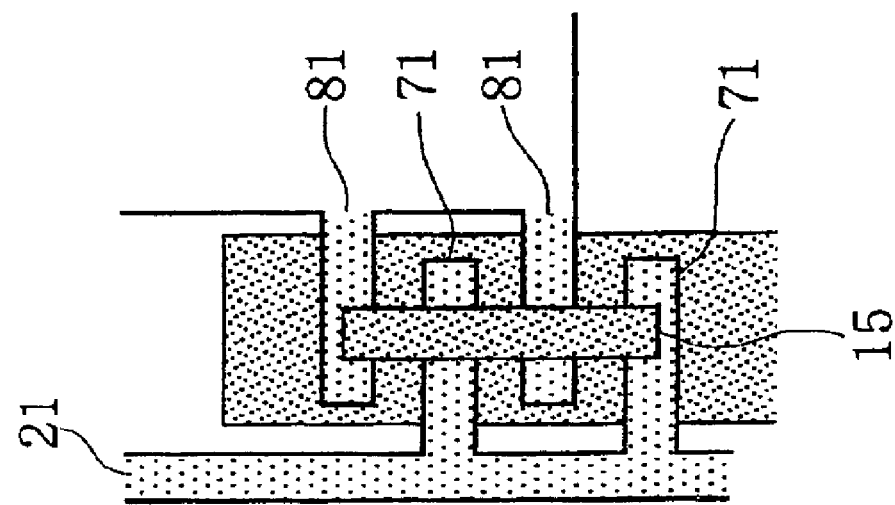

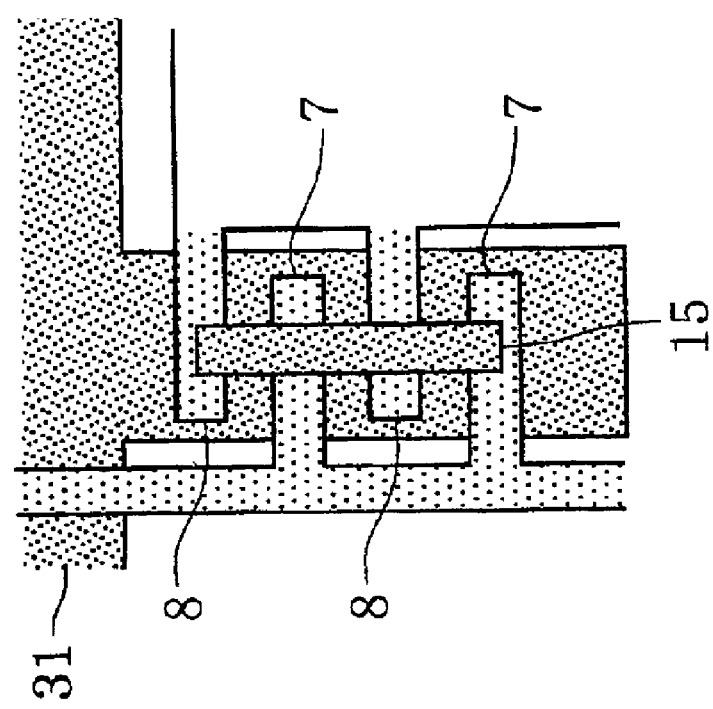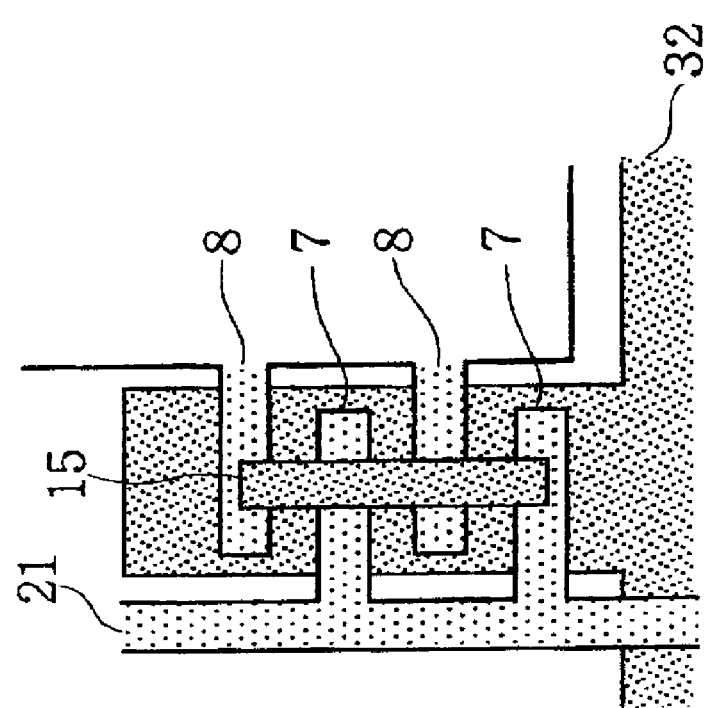
Fig. 19

Fig. 20
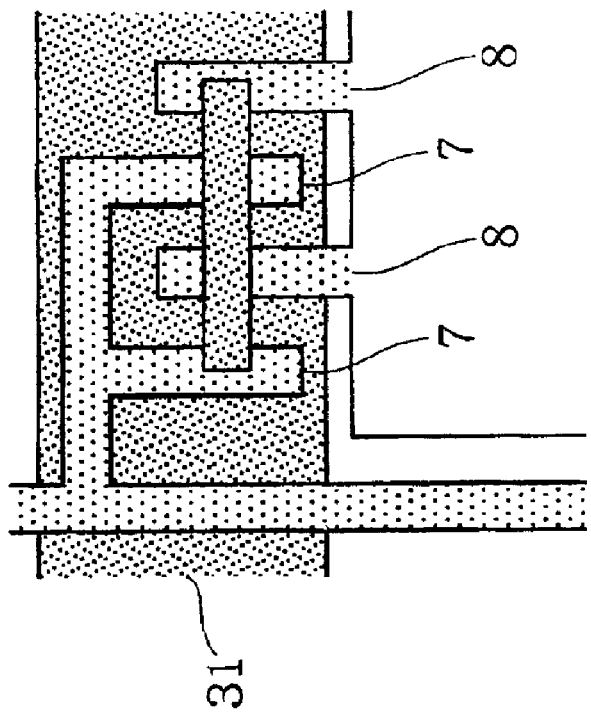
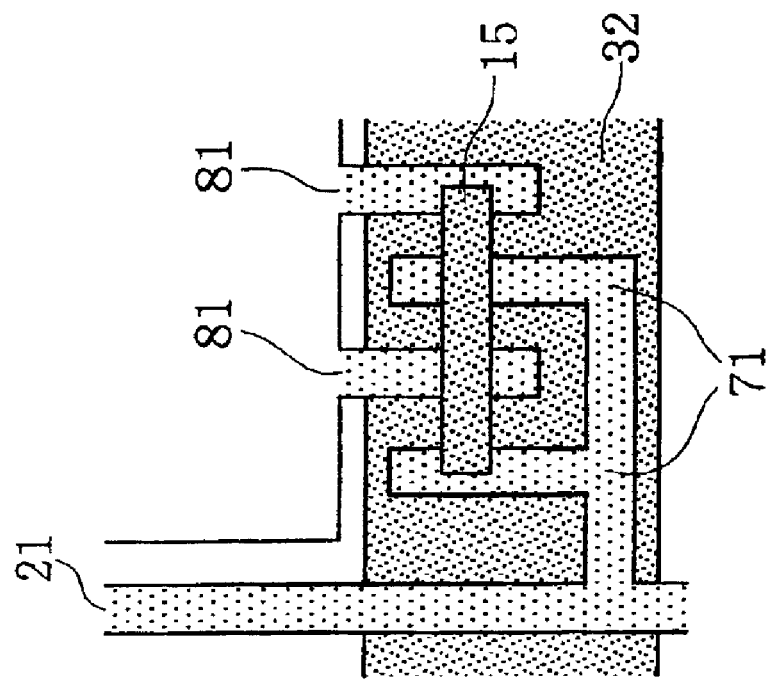

(1)

(2)

| G | B | R | G | B | R |
|---|---|---|---|---|---|
| B | R | G | B | R | G |
| R | G | B | R | G | B |
| G | B | R | G | B | R |
| B | R | G | B | R | G |
| R | G | B | R | G | B |

→

| | | Ⓡ | | | R |
|---|---|---|---|---|---|
| | Ⓡ | | | R | |
| Ⓡ | | | R | | |
| | | | R | | Ⓡ |
| | R | | | Ⓡ | |
| R | | | Ⓡ | | |

(3)

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

→

| Ⓡ | | | R | | |
|---|---|---|---|---|---|
| R | | | Ⓡ | | |
| Ⓡ | | | R | | |
| R | | | Ⓡ | | |
| Ⓡ | | | R | | |
| R | | | Ⓡ | | |

LIQUID CRYSTAL DEVICE

TECHNICAL FIELD

The present invention relates to liquid crystal devices and, more particularly, to an improvement in the display characteristics and the like of a liquid crystal display device for performing a pseudo dot inversion.

BACKGROUND ART (General Background Art)

Active matrix liquid crystal display devices using thin-film transistors (hereinafter also referred to as TFTs) as switching elements are used widely in various fields including notebook personal computers, large-sized monitors for desk-top personal computers, mobile data terminals, the display panels of digital video cameras, and liquid crystal televisions.

As conceptually shown in (1, 1) and (1, 2) of FIG. 1, a liquid crystal display device changes a state in which liquid crystal molecules 40 are oriented with impression of a specified voltage on electrodes located over and under a liquid crystal layer on a pixel-by-pixel basis, thereby changes the light transmittance of each of pixels, and resultantly displays an image. In the drawing, 90 and 91 denote the respective electrodes formed on upper and lower substrates, 93 denotes a polarizing plate, and 94 denotes a polarizing plate or a reflecting plate. If the impression of the voltage on the electrodes is for so-called dc driving in which the direction of an electric field is constantly the same, i.e., either the upper or lower electrode is used constantly as a positive or negative electrode when the pixel is in the state which allows (or does not allow) passage of light as shown in (1, 1) and (1, 2), positive or negative impurity ions in a liquid crystal layer are attracted to the negative or positive electrode so that the distribution of the electric field between the pixel electrodes and the common electrode changes. This makes it difficult to apply a proper electric field to the liquid crystal molecules and causes a problem in displaying a clear image.

There are also cases where the liquid crystal material is electrolyzed or degraded. The attraction of impurity ions 45 to the upper and lower electrodes is conceptually shown in (1, 2) of FIG. 1.

When the pixel is in the state which allows (or does not allow) passage of light as shown in (2, 1) and (2, 2) of FIG. 1, so-called ac driving is normally performed in which the direction of the electric field and the direction in which the liquid crystal molecules are arranged are inverted at specified intervals, i.e., the polarities of the upper and lower electrodes are inverted at specified intervals. An example of a circuit for the pixel to be used for this purpose is shown in (3, 1) and (3, 2) of FIG. 1.

The simplest scheme of ac driving is so-called frame inversion driving in which each of the pixels over the entire display surface when it is in the state which allows (or does not allow) passage of light has a positive upper electrode (and a negative lower electrode) in a given display period and has a negative upper electrode in the subsequent display period. In short, the frame inversion driving scheme applies signals of the same polarity to each of the pixels over the entire display surface and inverts the polarity on a per display period basis.

However, an actual liquid crystal panel is asymmetrical because of the TFTs provided as the switching elements therein so that display brightness slightly differs depending on the positive or negative polarity of the impressed voltage. In the frame inversion driving scheme in which the signal of the same polarity is written in each of the pixels over the entire display surface, therefore, the difference in brightness between a frame in which a positive signal is applied and a frame in which a negative signal is applied is observed as flicker. It is to be noted that the structure of the pixel, the motion of the liquid crystal molecules, the circuit for inversion, or the like in the liquid crystal device shown in FIG. 1 is strictly exemplary or conceptual and there are other types of variations. However, the basic items of frame inversion driving, control of light transmission using the motion or tilt of the liquid crystal molecules responsive to the electric field, and the like are the same.

To eliminate flicker, there is a method in which pixels with reversed polarities are alternately arranged in two dimensions so that brightness is averaged. As examples of the method, there can be listed image-signal-line inversion driving which changes the polarity on a per image-signal-line basis, scan-signal-line inversion driving which performs polarity inversion on a per scan-signal-line basis, a combination of the image-signal-line inversion driving and the scan-signal-line inversion driving, and dot inversion driving which inverts the polarity of an electric field applied to pixels adjoining longitudinally and laterally in a screen on a per pixel basis.

Of the foregoing methods, the dot inversion driving has the advantages of unobtrusive flicker and display with a uniform brightness distribution since the pixels of positive and negative polarities are arranged in a checkered pattern. However, the dot inversion driving has the disadvantages of increased power consumption and increased charging load on a driving IC since the polarities are inverted in each of the rows and columns and therefore a driving waveform presents an increased number of voltage inversions during the transfer of a signal voltage to the driving IC and during the charging of the pixel with an image signal. To eliminate the disadvantages, Japanese Unexamined Patent Publication No. HEI 4-223428 discloses pseudo dot inversion driving which provides dot inversion display as a polarity pattern on a screen, while performing the image-signal-line inversion driving and the scan-signal-line inversion driving in terms of electric signals. The pseudo dot inversion driving aims at highly uniform display, similarly to the dot inversion driving, but with a simpler driving waveform than used by the dot inversion driving.

In (1) and (2) of FIG. 2 are shown two equivalent circuits for a liquid crystal display device, which are for performing pseudo dot inversion driving and disclosed in the foregoing publication. In each of the circuits, a TFT 1 is disposed in the vicinity of each of the points of intersection of a plurality of image signal lines 2 and intersecting scan signal lines 3 in such a manner that connection is provided between the source and gate electrodes of the TFT 1. The drain electrode of the TFT 1 is connected to a liquid crystal layer 4 and to accumulated capacitance 5 in parallel with the liquid crystal layer 4.

In (1) of FIG. 2, the TFTs 1 of two longitudinally adjoining pixels along the image signal lines 2 have respective source electrodes connected to the different image signal lines 2. If the liquid crystal panel is driven in the image-signal-line inversion scheme, the polarities of voltages impressed on the individual pixels are inverted as shown in FIG. 3 so that dot inversion display is achieved.

On the other hand, (2) of FIG. 2 illustrates another method in which the TFTs 1 of laterally adjoining pixels along the scan signal lines 3 have respective gate electrodes connected to the different scan signal lines 3. In the liquid crystal panel, the polarities of voltages impressed on the adjacent pixels are inverted by the scan-signal-line inversion driving so that dot inversion display is achieved.

Thus, dot inversion display is achievable by performing the image-signal-line inversion driving in the liquid crystal display panel in which the source electrodes of the adjoining TFTs in the region enclosed by the adjacent two image signal lines are connected to the different image signal lines or in the liquid crystal display panel in which the gate electrodes of the adjoining TFTs in the region enclosed by the adjacent two scan signal lines are connected to the different image signal lines.

In either case, the polarity of the voltage impressed on each of the pixels is inverted in the subsequent frame period such that an ac voltage is impressed on each of the pixels. (Background Art Viewed from Problems to be Solved by the Invention)

During the fabrication of a liquid crystal display panel, layers including a metal film, a semiconductor layer, and an insulating layer are deposited (formed) a plurality of times and the total of five to eight photolithographic steps are normally performed after the deposition of each layer or after the deposition of given materials so as to pattern the individual layers (the process of removing unwanted portions and regions of the layers composed of the deposited given materials by dry etching or the like and leaving only the required portions), whereby TFTs, pixels, and the like are formed. When the photolithographic steps are performed, alignment is effected between a substrate and a photo mask. However, an alignment shift (misalignment) of about one micrometer to several micrometers does occur depending on conditions including the sizes of the substrate and the display surface.

FIGS. 4 and 5 are views for illustrating the influence of the shift in a conventional TFT. It is to be noted that the depiction of a distinct boundary between insulating and protective films may be omitted in the subsequent plan views. In the steps of fabricating a TFT, the source and drain regions are typically formed by simultaneously pattering metal in a single layer. For the sake of clarity, the drawings show an exemplary case where the source and drain electrodes are shifted only in a direction parallel to the scan signal lines. Problems occurring in the case of a shift in an orthogonal direction are negligible, though they differ depending on the configuration and size of the gate electrode.

In each of FIGS. 4 and 5, each of the TFTs 1 is composed of: a gate electrode 11; a source electrode 7, 71, or 72; a drain electrode 8, 81, or 82; and a channel protective film 14 and formed in the vicinity of each of the points of intersection of the image signal lines 2 and the scan signal lines 3. The gate electrodes 11 are connected to the scan signal lines and the source electrodes 12 are connected to the image signal lines. The drain electrodes 8, 81, and 82 are connected to the pixel electrodes 6. Although the relative sizes of the pixel electrodes are larger, they are depicted narrower and smaller since they are not directly relevant to the spirit of the invention.

A cross-sectional view of the portion of the TFT is shown in the lower part of FIG. 4. In the drawing, 9 denotes a substrate, 89 denotes a contact hole for the drain electrode, 79 denotes a contact hole for the source electrode, and 141 denotes a gate insulating film. As can be clearly seen from the cross-sectional view, metal films 82 and 72 forming the source and drain electrodes are opposed to the semiconductor layer 15 with a channel protective film 142 interposed therebetween and capacitances are formed at the overlapping portions (the hatched and dotted portions in the drawing) when viewed from above an upper surface orthogonal to the substrate surface.

In FIG. 5, an electrode area occupied by the overlapping portion between the channel protective film 14 and source electrode of the TFT is designated at Ss and an electrode area occupied by the overlapping portion between the channel protective film 14 and drain electrode of the TFT is designated at Sd. In the TFT shown in (1) of FIG. 5 which is free from an alignment shift, Ss=Sd is satisfied. In the case where a shift occurs in the direction in which the overlapping region between the source electrode 71 and the channel protective film 14 increases as in (2) of FIG. 5 (rightward in the drawing), Ss>Sd is satisfied. In the case where a shift occurs in the direction in which the overlapping region between the source electrode 72 and the channel protective film 14 decreases as in (3) of FIG. 5 (leftward in the drawing), Ss<Sd is satisfied conversely. In short, an ability difference is produced between the TFTs depending on the direction of a shift.

FIG. 4 shows the case where the source and drain electrodes of the TFT structure for performing the pseudo dot inversion driving by the image-signal-line inversion driving using the equivalent circuit configuration of (1) of FIG. 2 are displaced rightward relative to the scan signal lines.

In the structure shown in the drawing, the source electrodes of the longitudinally adjoining TFTs which are interposed between the two image signal lines are connected to the different image signal lines. Specifically, one TFT 101 of the two TFTs interposed between the two adjacent image signal lines 21 and 22 has the source electrode 71 connected to the image signal line 21 and the other TFT 102 has the source electrode 72 connected to the image signal line 22 other than the image signal line 21.

In the structure, the rightward displacement of the source and drain electrodes increases the overlapping region between the source electrode 71 and the channel protective film in the upper TFT 101, while it decreases the overlapping region between the source electrode 72 and the channel protective film in the lower TFT 102. Accordingly, Ss>Sd is satisfied in the TFT 101 connected to the image signal line 21, while Ss<Sd is conversely satisfied in the TFT 102 connected to the image signal line 22.

Thus, the capacitance between the source and gate electrodes of the TFT and the capacitance between the drain and gate electrodes of the TFT differ from one scan signal line to another due to an alignment shift during the fabrication of the TFT. This causes a difference between the charging abilities of the adjacent pixels and non-uniform display such as flicker or a vertical/horizontal string.

The occurrence of the foregoing problems is not limited to the channel-protective-film bottom-gate thin film transistor. FIG. 6 shows the case of a thin-film transistor of another type. In (1) of FIG. 6 is shown the case of a top-gate thin-film transistor. In (1) of FIG. 6, the distance LSG between the gate electrode 11 and the source electrode 7 is different from the distance LDG between the gate electrode 11 and the drain electrode 8. In addition, the distance LSLDD between the LDD region 151 and the contact hole 79 for the source electrode is also different from the distance LDLDD between the LDD region 151 and the contact hole 89 for the drain electrode. Although the gate insulating film 141 and the channel protective film 142 are formed in (1) of FIG. 6, the latter may not be formed in some cases.

In (2) of FIG. 6 is shown a channel-etched bottom-gate thin-film transistor, in which the overlapping portion between the source electrode 7 and the semiconductor layer 15 is larger than the overlapping portion between the drain electrode 8 and the semiconductor layer.

In (3) of FIG. 6 is shown the case of the channel-etched bottom-gate thin-film transistor in which an alignment shift has occurred between the gate electrode 11 and the semiconductor layer 15. Although thin-film transistors other than the foregoing include one in which, e.g., the length of the gate electrode in the channel direction (width) is smaller than that of the semiconductor layer, the occurrence of the foregoing problems cannot be circumvented in any type.

The occurrence of the problems is not limited to a thin-film transistor. Similar problems may also occur in a diode, which are illustrated by using FIG. 7. In (1) of FIG. 7 is shown a plan view of one pixel in a liquid crystal display device using a diode. In the drawing, 111 denotes a diode, 6 denotes a pixel electrode, 2 denotes a counter electrode, 3 denotes a first electrode, 60 denotes a metal layer (end portion) connected to the pixel electrode, and 14 and 15 denote an insulating film and a semiconductor layer.

A driving method will be described for reference purposes. In accordance with the method, a scan signal for the diode is inputted to a scan line. The diode to which the ON signal has been inputted is turned ON and the pixel electrode 6 has the same potential as the ON voltage for the diode. The difference between an image signal applied to an image signal time and the pixel potential is stored in a liquid crystal layer. The diode is turned OFF during the scanning of the subsequent scan line and the voltage impressed in the ON state is held, whereby display and the like are effected.

If the end portion 60 of the pixel electrode is covered completely with the first electrode 99 as shown in (2) of FIG. 7, an alignment shift is irrelevant. In reality, however, the end portion 60 is covered halfway as shown in (3) of FIG. 7, so that a variation occurs in the capacitance of the portion encircled by the symbol ○.

Accordingly, the development of technology has been desired which allows thin-film transistors arranged over the entire surface of a liquid crystal display panel for particularly performing pseudo dot inversion driving to have equal charging abilities even if an alignment shift occurs between the individual layers.

DISCLOSURE OF THE INVENTION

To solve the foregoing problems, the present invention has contrived source and drain electrodes and marginal lines thereof which extend along scan signal lines or image signal lines such that overlapping portions between the individual components of each of TFTs within a liquid crystal panel do not vary when an alignment shift occurs and Ss=α·Sd is constantly satisfied even under worst conditions. In addition, the present invention has also contrived placement and configuration.

Besides, the present invention has also effected an improvement in color display performance in pseudo dot conversion and the like.

Specifically, the following structures have been adopted.

In one aspect, the present invention is a liquid crystal device having: a large number of image signal lines and a large number of scan signal lines provided on a glass substrate or panel in accordance with the specifications or the like with spacings corresponding to pixel size (which is about 40 to 100 μm depending on pixel type, uses of the device, and the like), the width of a black matrix between pixels, and the like; the pixels arranged in a so-called check pattern in a region enclosed by the two types of signal lines; and a TFT (which may be a diode or the like in some cases) formed at any of upper, lower, left, and right corners of each of the pixels or in the vicinity thereof, wherein the semiconductor portion, source electrode, gate electrode, and drain electrode of the TFT have marginal portions extending in the same direction as the image signal lines or scan signal lines (in parallel with one of the image and scan signal lines and orthogonal to the other). Each of the electrodes has an angular, especially rectangular configuration (including a square configuration. In some cases, it may be an L-shaped or like configuration).

In addition, the positions and sizes of the semiconductor portion, the gate electrode, the drain electrode, and the source electrode are determined such that, even if a mask alignment (placement) slightly shifts during the formation thereof especially by photolithography, the overlapping portion between the gate electrode and the semiconductor layer is invariable and at least one (preferably both and basically both in practical use) of the overlapping portion between the gate electrode and the drain electrode and the overlapping portion between the gate electrode and the source electrode is invariable when viewed from above the substrate (the direction orthogonal to the display surface or the side from which the user views the display surface of the product).

When attention is focused on two TFTs which are (in principle) adjacent to each other in the longitudinal or lateral direction, even if a variation occurs depending on the direction of an alignment shift, the variation occurs equally in each of the overlapping portions between the gate electrode and the other two electrodes.

This allows automatic compensation for a capacitance variation caused by an alignment shift in a normal range (about 2 to 3 μm and 6 μm in some cases depending on the sizes of the pixel, TFT, and the like) via a gate insulating film between the gate and drain electrodes, a channel protective film between the gate and source electrodes, or the like.

Likewise, compensation is provided for a capacitance variation caused by variations in the distance between the gate and drain electrodes or between the gate and source electrodes, in the distance between the end of the portion of the semiconductor layer immediately under the gate electrode or the end portion of the LDD region and the drain or source electrode, and in the distance between contact holes for the electrodes.

If the two TFTs that have been paired up compensate for an alignment shift, consideration is also given to the longitudinal or lateral arrangement of the source (S) and drain (D) electrodes of the TFTs such that a pattern of SDSD or DSDS is achieved in the drawing. It will also be appreciated that, in this case, the types or models of the TFTs are not limited and any TFTs may be used whether they are of bottom-gate type, channel-etched type, or top-gate type.

If attention is focused on one TFT in which the number of at least one of the source and drain electrodes is plural, the plurality of (numerous in most cases and normally two for fabrication convenience) electrodes of the TFT include two located aside the respective ends in the longitudinal or lateral direction of one of the other (smaller number of) electrodes and the semiconductor portion of the TFT located above or below the substrate have the ends located near the respective center portions of the widths of the electrodes located aside the ends in the longitudinal direction. This provides compensation for variations in the overlapping portion caused by an alignment shift.

If one TFT has a large number of source electrodes and a large number of drain electrodes, the source and drain electrodes are preferably arranged such that they alternate longitudinally or laterally.

The source or drain electrode is formed to have an L-shaped configuration such that the L-shaped portion fits in and overlaps the semiconductor portion (layer) located above or below the substrate.

The position at which the TFT, in particular the gate electrode portion, is formed is determined such that the area, aperture ratio, and brightness of a pixel portion are improved.

Besides, compensation is also provided for an alignment shift even with diodes by contriving the arrangement thereof and the like.

To retain excellent performance over an extended period, the polarity of each pixel is inverted on a per predetermined-number-of-display-periods basis, e.g., on a per display period basis in terms of display characteristics. Likewise, the polarity is inverted on a per predetermined-number-of-signal-lines basis, e.g., on a per scan (signal) line bases or on a per image (signal) line basis. In particular, so-called pseudo dot inversion is adopted in which the pixels corresponding to the positive and negative polarities are arranged longitudinally or laterally adjacent to each other and which allows the use of a relatively simple circuit. In this case, the arrangement and placement of the TFTs, particularly the longitudinal or lateral juxtaposition of the source and drain electrodes of the pair of TFTs and the connection thereof to the individual signal lines are determined such that compensation is provided for the alignment shift described above.

If the individual pixels in three primary colors for color display are arranged in a so-called mosaic pattern in pseudo dot inversion, lines composed of positive pixels and lines composed of negative pixels are alternately arranged in oblique directions for each of the colors, which may cause a problem when viewed from a professional standpoint. To prevent this, the positive and negative pixels are alternately arranged (in the longitudinal direction) in so-called stripes in each of the primary colors. In the adjacent stripes in the same color, the positive and negative pixels are shifted by one pixel position (in the longitudinal direction), which provides color display suitable for professional use.

The present invention is also applicable to an extended use in equipment in which a liquid crystal is driven with a switching element.

BRIEF DESCRIPTION OF THE DRAWINGS

FIG. 2 is an equivalent circuit diagram when a TFT is used to drive a conventional liquid crystal;

FIG. 6 shows embodiments of an alignment shift in various (types of) thin-film transistors;

FIG. 7 shows the occurrence of an alignment shift in a diode;

FIG. 17 is a view showing 1 of the eighth embodiment;

FIG. 19 is a view showing 1 of the eighth embodiment;

FIG. 20 is a view showing 1 of the eighth embodiment;

EXPLANATIONS OF LETTERS OR NUMERALS 1, 101, 102 . . . Thin-Film Transistors (TFTs)
111 . . . Diode
2, 21, 22 . . . Image Signal Lines
3, 31, 32 . . . Scan Signal Lines
40 . . . Liquid Crystal Molecule
4 . . . Liquid Crystal Layer
45 . . . Impurity Ion
5 . . . Accumulated Capacitance
6 . . . Pixel Electrode
60, 61, 62 . . . Pixel Electrodes
7, 71, 72 . . . Source Electrodes
8, 81, 82 . . . Drain Electrodes
11, 12 . . . Gate Electrode
14 . . . Channel Protective Film
15 . . . Semiconductor Layer
9 . . . Substrate
90 . . . Upper Substrate (Upper Electrode)
91 . . . Lower Substrate (Lower Electrode)
92 . . . Counter Electrode
93 . . . Polarizing Plate
94 . . . Polarizing Plate, Reflecting Plate

BEST MODES FOR CARRYING OUT THE INVENTION

The present invention will be described based on the embodiments thereof.

(Embodiment 1)

The present embodiment relates to an improvement in the plan arrangement of two pixels adjoining along image signal lines on a liquid crystal display panel for performing a pseudo dot inversion shown in (1) of FIG. 2.

Figure 8:
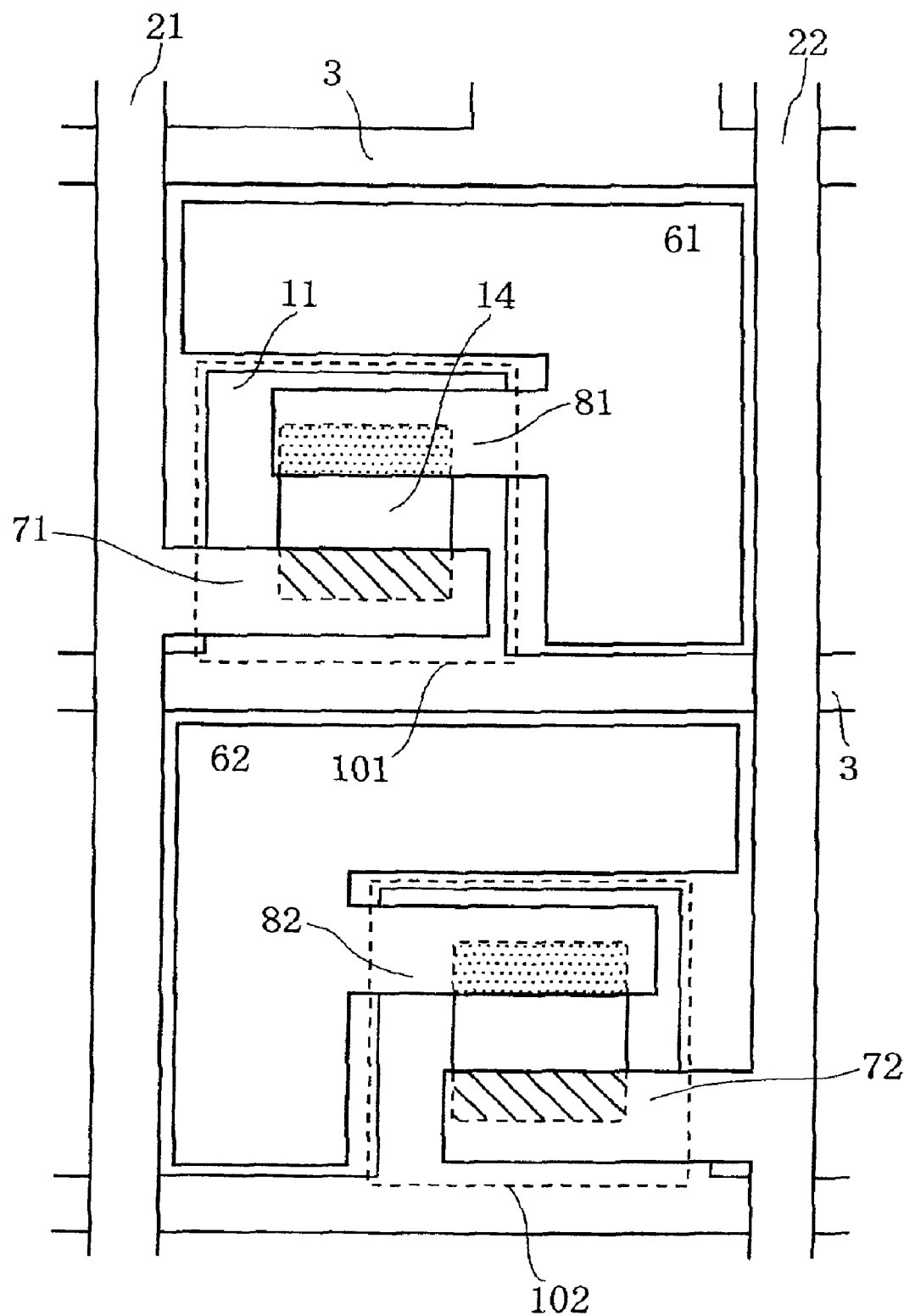
FIG. 8 is a view showing the arrangement of TFTs on a liquid crystal panel according to a first embodiment of the present invention.

FIG. 8 shows a principal portion of the present embodiment. In the drawing, first and second bottom-gate TFTs 101 and 102 are formed in the vicinity of the points of intersection of first and second image signal lines 21 and 22 and scan signal lines 3 intersecting the first and second image signal lines 21 and 22. The TFTs have respective gate electrodes 11 connected to the scan signal lines 3, respective source electrodes 71 and 72 connected to the image signal lines 21 and 22, and respective drain electrodes 81 and 82 connected to pixel electrodes 61 and 62. Each of the pixel electrodes holds a liquid crystal between itself and a common electrode formed on the counter substrate. In general, each of the pixel electrodes forms an accumulated capacitance between itself and the scan signal line or an additional accumulated capacitance line formed to compensate for a reduction in a write voltage on a liquid crystal layer during a voltage retention period caused by a leakage current in the TFT. However, the depiction of the accumulated capacitance and the accumulated capacitance line is omitted because of its intricacy and obviousness.

The liquid crystal display panel is characterized in that the channel direction connecting the source and drain electrodes of the TFTs serving as the switching elements is in orthogonal relation to the image signal lines 21 and 22. As a result, the drain and source electrodes 81 and 71 of the TFT 101 and the drain and source electrodes 82 and 72 of the TFT 102 are alternately arranged along the image signal lines (from top to bottom) in FIG. 8.

Consideration will be given to the case where an alignment shift occurs in FIG. 8 and the source and drain electrodes of the two TFTs are displaced in parallel with the scan signal line 3. In this case, the areas Ss and Sd of the overlapping portions between the channel protective film and the source electrode 71 or 72 and between the channel protective film and the drain electrode 81 or 82 are invariable in each of the TFTs, which is different from the conventional TFT. Consequently, the ability to charge each of the pixels is no more different from one scan signal line to another.

An alignment shift may also occur in a direction perpendicular to the scan signal line but, in this case also, the ratio between the areas Ss and Sd of the overlapping portion between the channel protective film and the source electrode and between the channel protecting film and the drain electrode is equal in each of the two TFTs.

Although the drain and source electrodes are arranged along the image signal lines (from top to bottom) in FIG. 8, it will easily be understood that the drain and source electrodes may also be arranged in the reverse order (SDSD). It will be appreciated that each of the electrodes is not limited to a particular configuration and may have a rectangular or like configuration in consideration of compensation for displacement, production, and the like provided that the electrode is composed of parallel portions whether it is slightly large in width or length. It will also be appreciated that the pixel portion is equipped with a black matrix, an alignment (orientation) film, a color filter, a polarizing plate, and the like if required, though they are not shown for the prevention of intricacy because they have no direct relevance to the spirit of the invention. The same shall apply to the other embodiments which will be described later.

(Embodiment 2)

The present embodiment is characterized in that the source and drain electrodes of the TFTs are arranged in succession along the scan signal lines.

Figure 9:
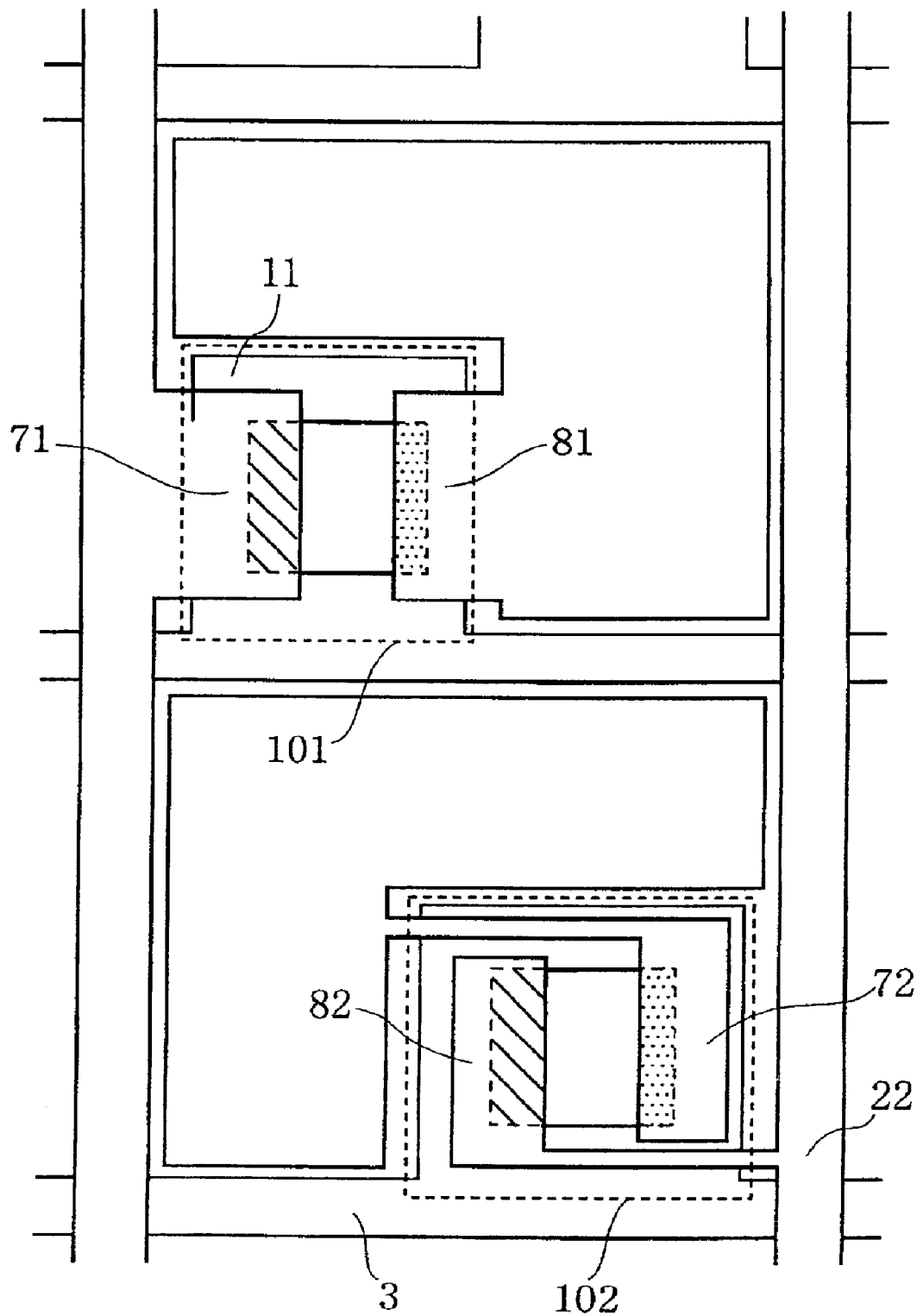
FIG. 9 is a plan view of a liquid crystal panel according to a second embodiment of the present invention.

FIG. 9 shows the present embodiment. The present embodiment also aims at a liquid crystal display panel using bottom-gate TFTs to perform a pseudo dot inversion, similarly to the preceding embodiment shown in FIG. 8.

In contrast to the preceding embodiment in which the drain and source electrodes 81 and 71 and the drain and source electrodes 82 and 72 are alternately arranged along the image signal lines (from top to bottom in the drawing), the source and drain electrodes 71 and 81 and the source and drain electrodes 72 and 82 are arranged in succession along the scan signals (from left to right) in the present embodiment.

Figure 4:
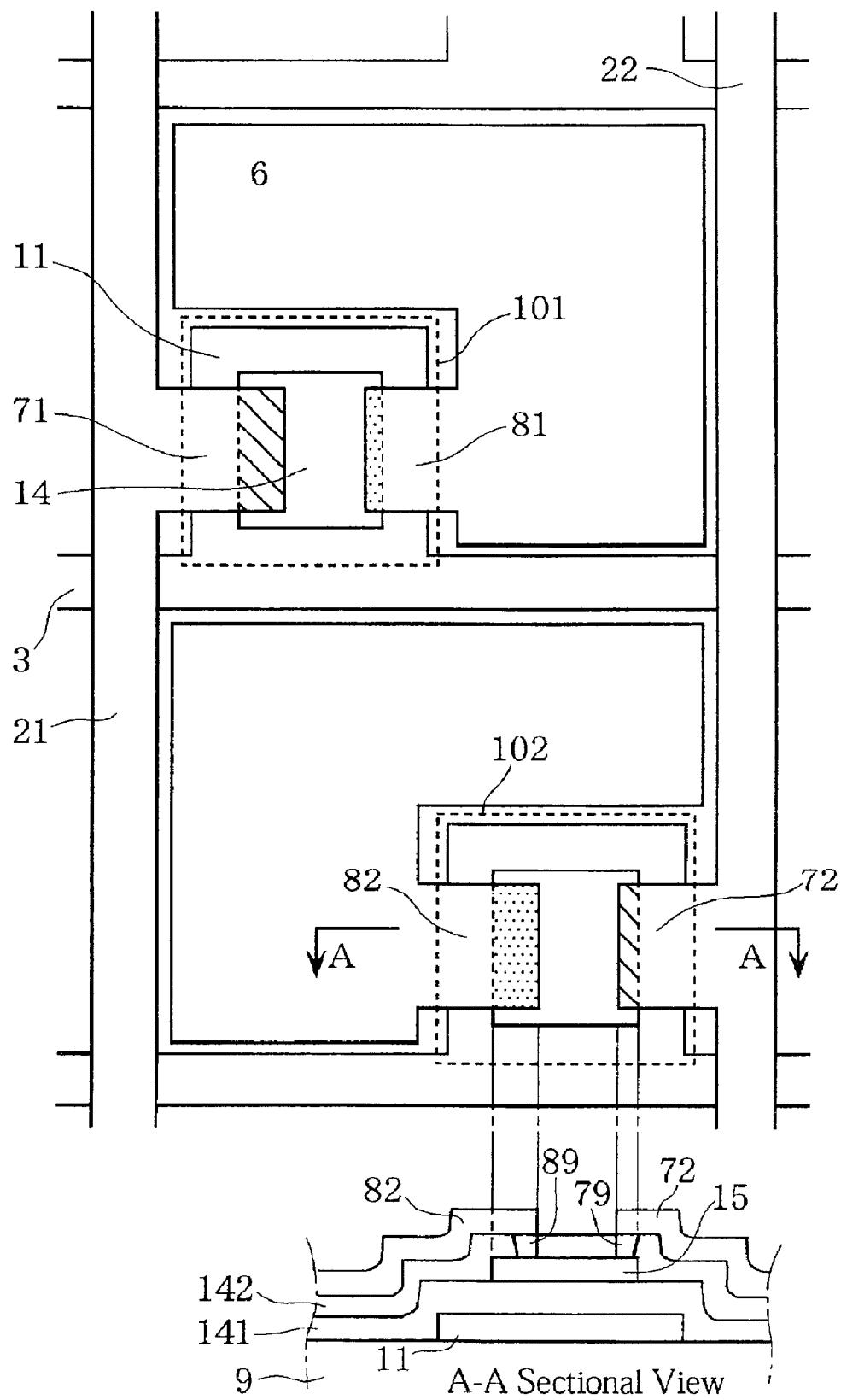
FIG. 4 includes plan and cross-sectional views of a TFT as a prior art switching element for a pixel.
Figure 5:
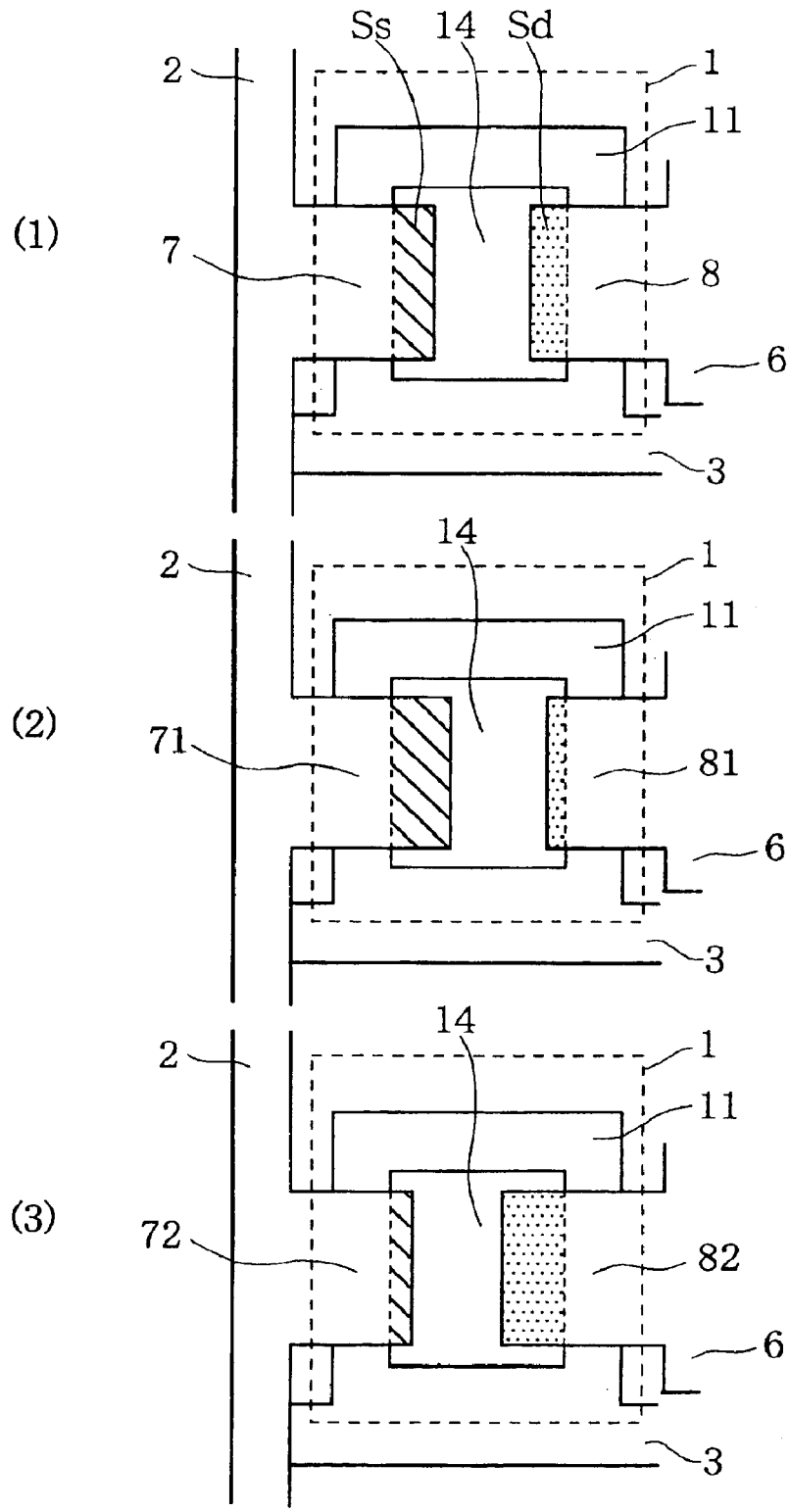
FIG. 5 is a view for illustrating an alignment shift.

FIG. 4 shows the case where the source and drain electrodes of the TFTs are displaced in parallel with the scan signal line 3. Due to an alignment shift, the TFTs have different electrode areas Ss and Sd occupied by the overlapping portions between the channel protective films 14 of the two TFTs and the source and drain electrodes thereof However, the two TFTs and all TFTs in the panel have equal variations in Ss and Sd, which is different from the TFTs in the conventional structure. Consequently, the ability to charge each of the pixels is no more different from one scan signal line to another.

It will be appreciated that an alignment shift perpendicular to the scan signal lines exerts no influence on the structure shown in FIG. 4.

Although the drain and source electrodes of the TFT in the lower part of the drawing have slightly irregular configurations in the present embodiment, they present no particular problem (in practical use). However, it will be understood that compensation may be provided for the size of the pixel or the like.

(Embodiment 3)

The present embodiment is characterized in that the gate electrodes of TFTs adjoining along the scan signal lines are connected to the different scan signal lines.

Figure 10:
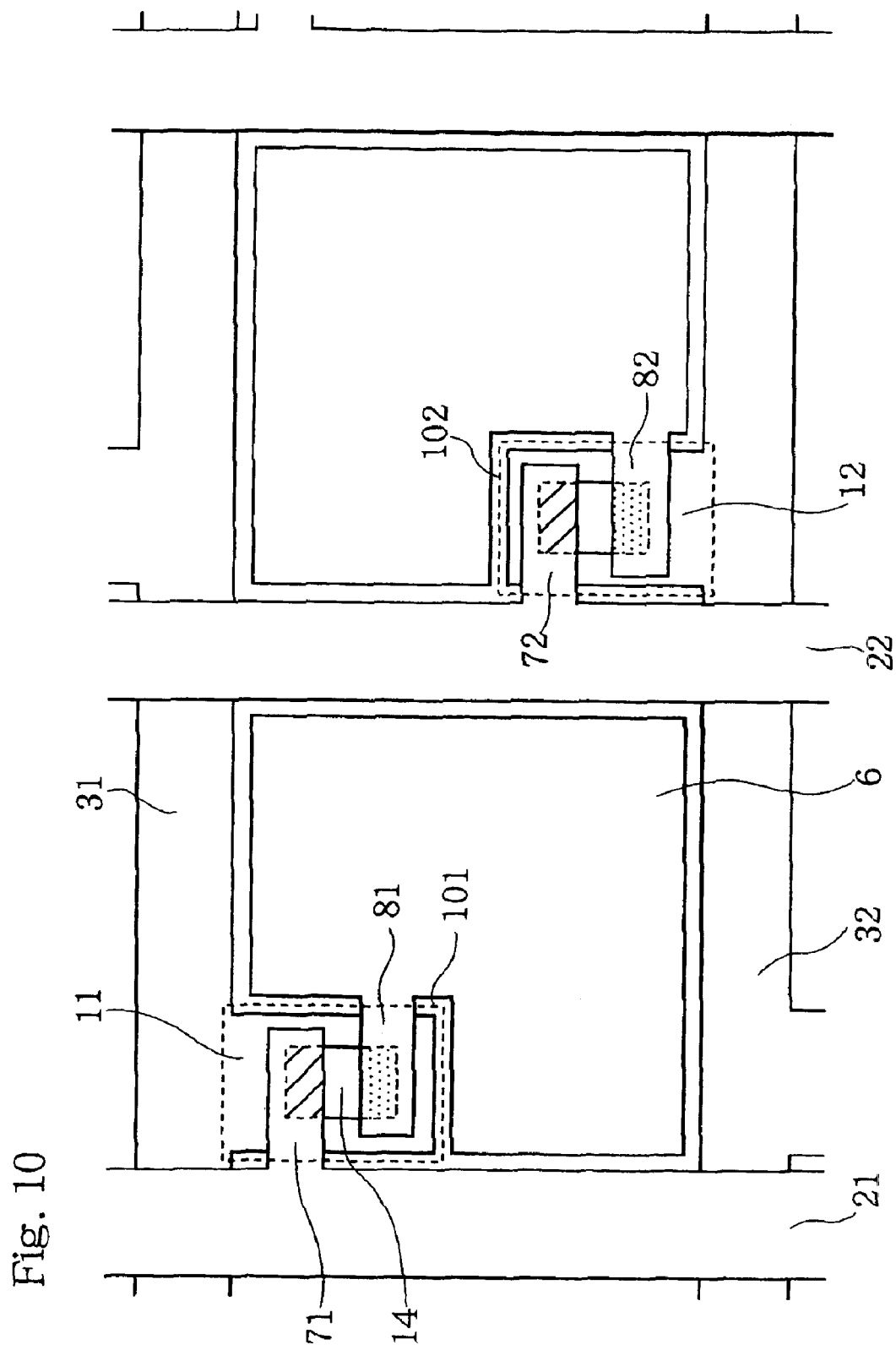
FIG. 10 is a plan view showing the arrangement of TFTs on a liquid crystal panel according to a third embodiment of the present invention.

FIG. 10 shows a liquid crystal display panel according to the present embodiment. The present embodiment also aims at a liquid crystal display panel for performing pseudo dot inversion driving shown in (2) of FIG. 2. FIG. 10 shows two pixels adjoining along the scan signal lines on the panel. Each of the first and second TFTs 101 and 102 has a gate electrode 11, a source electrode, a drain electrode, and a channel protective film 14. The depiction of the accumulated capacitances and the accumulated capacitance lines is omitted.

The first TFT 101 has the source electrode 71 connected to the first image signal line 21, the gate electrode 11 connected to a first scan line 31, and the drain electrode 81 connected to a pixel electrode 6. The second TFT 102 has the source electrode 72 connected to the second image signal line 22, the gate electrode 12 connected to a second scan signal line 32, and the drain electrode 82 connected to the pixel electrode.

As a consequence, the source and drain electrode 71, 81, 72, and 82 of the two TFTs are arranged in this order along the image signal lines (from top to bottom) in FIG. 10.

In the structure also, charging abilities are no more different from one TFT to another even if an alignment shift occurs between the individual layers and excellent image display can be performed, similarly to the first embodiment.

(Embodiment 4)

The present embodiment is characterized in that the source and drain electrodes of the TFTs are arranged in succession along the scan signal lines.

Figure 11:
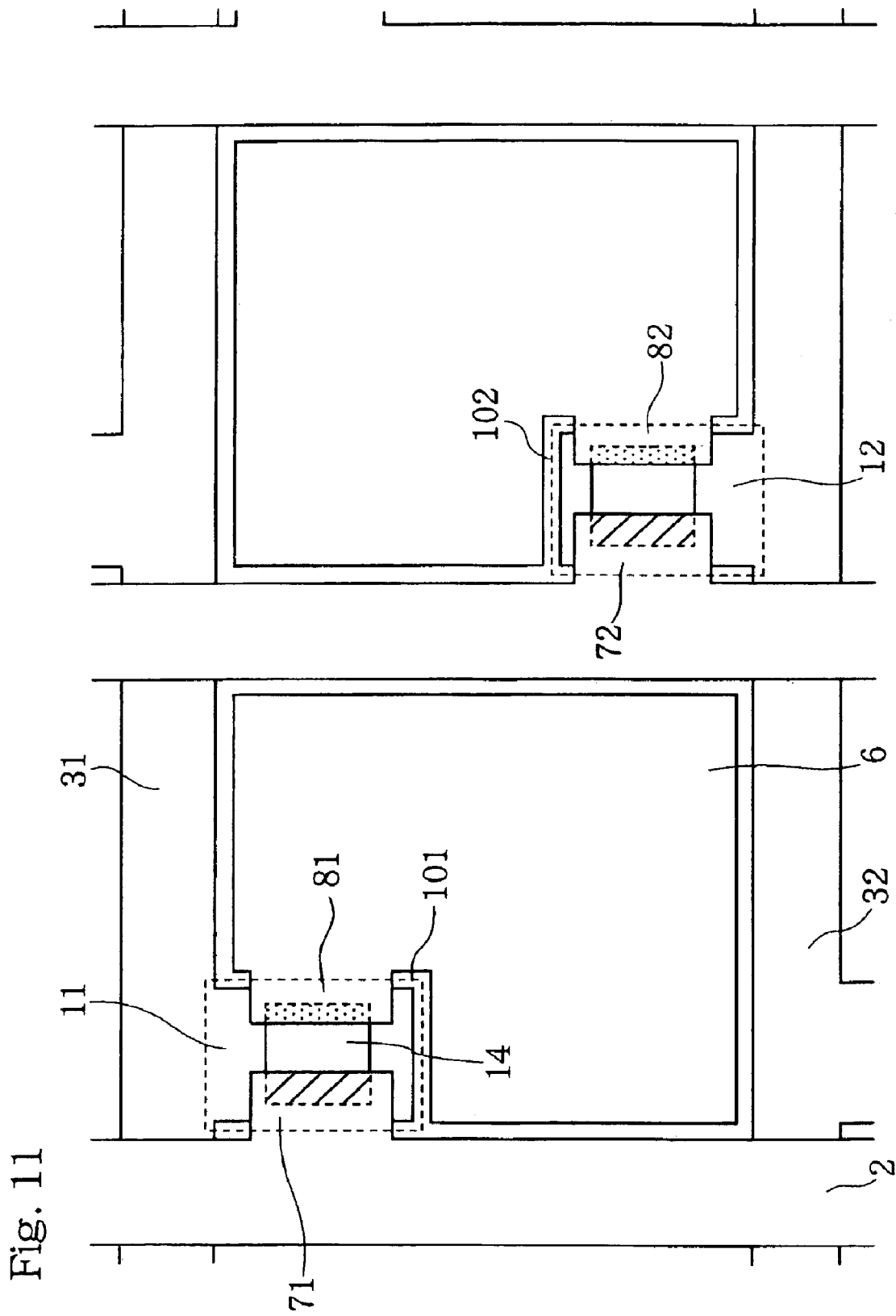
FIG. 11 is a plan view showing the arrangement of TFTs on a liquid crystal panel according to a fourth embodiment of the present invention.

FIG. 11 shows the present embodiment. The present embodiment also relates to a liquid crystal display panel for performing pseudo dot inversion driving shown in (2) of FIG. 2, similarly to the preceding third embodiment.

In contrast to the preceding embodiment shown in FIG. 10 in which the source and drain electrodes 71 and 81 and the source and drain electrodes 72 and 82 are arranged in this order from top to bottom along the image signal lines, the source and drain electrodes 71 and 81 and the source electrode and drain electrodes 72 and 82 are arranged in this order from left to right along the scan signal lines in the present embodiment shown in FIG. 11.

In the structure also, charging abilities are no more different from one TFT to another even if an alignment shift occurs between the individual layers and excellent image display can be performed for the same reasons as described in the first embodiment.

(Embodiment 5)

The present embodiment forms TFTs on the scan signal lines.

Figure 1:
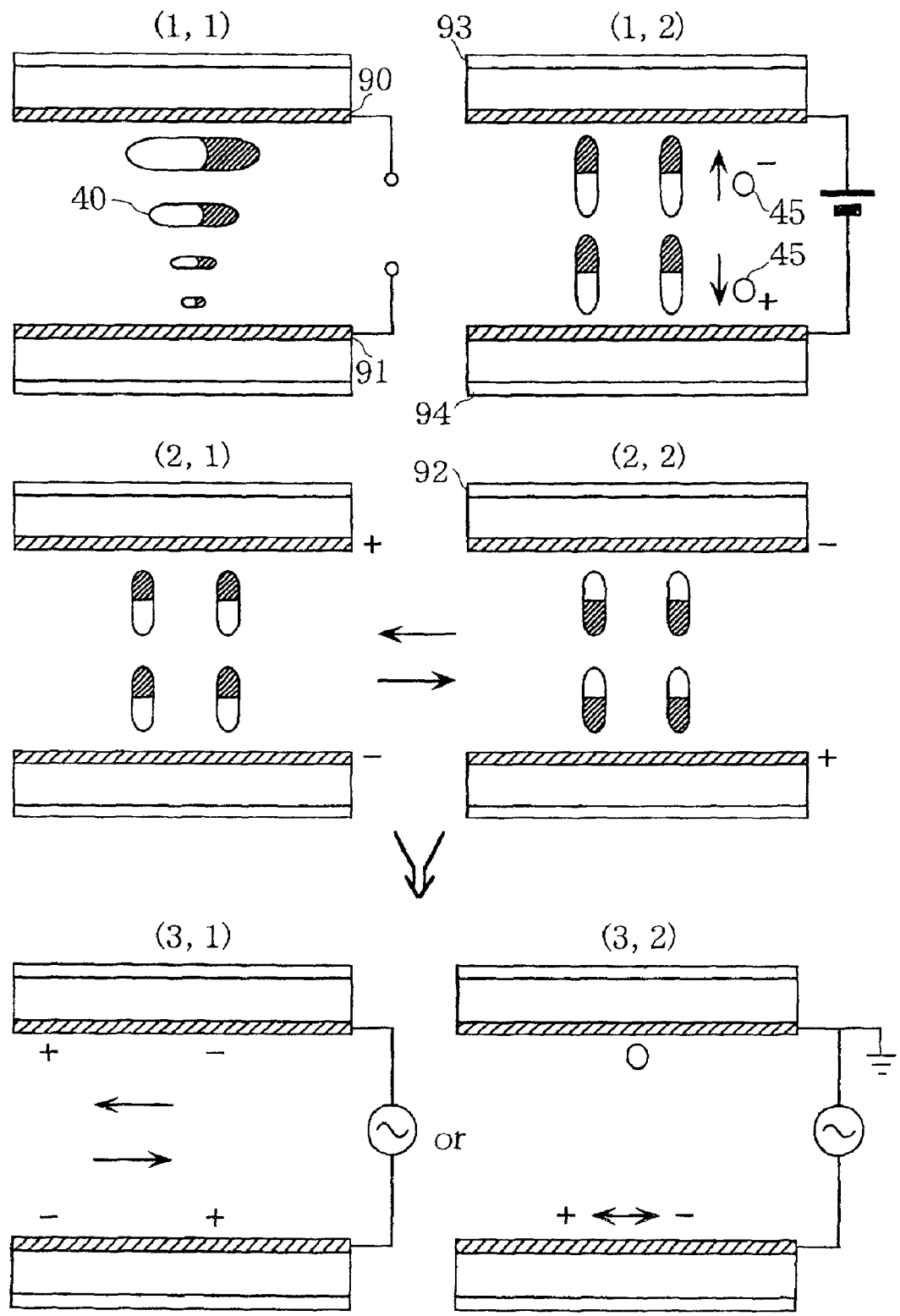
FIG. 1 is a view showing the application of an ac current in a pixel and the advantage thereof.
Figure 12:
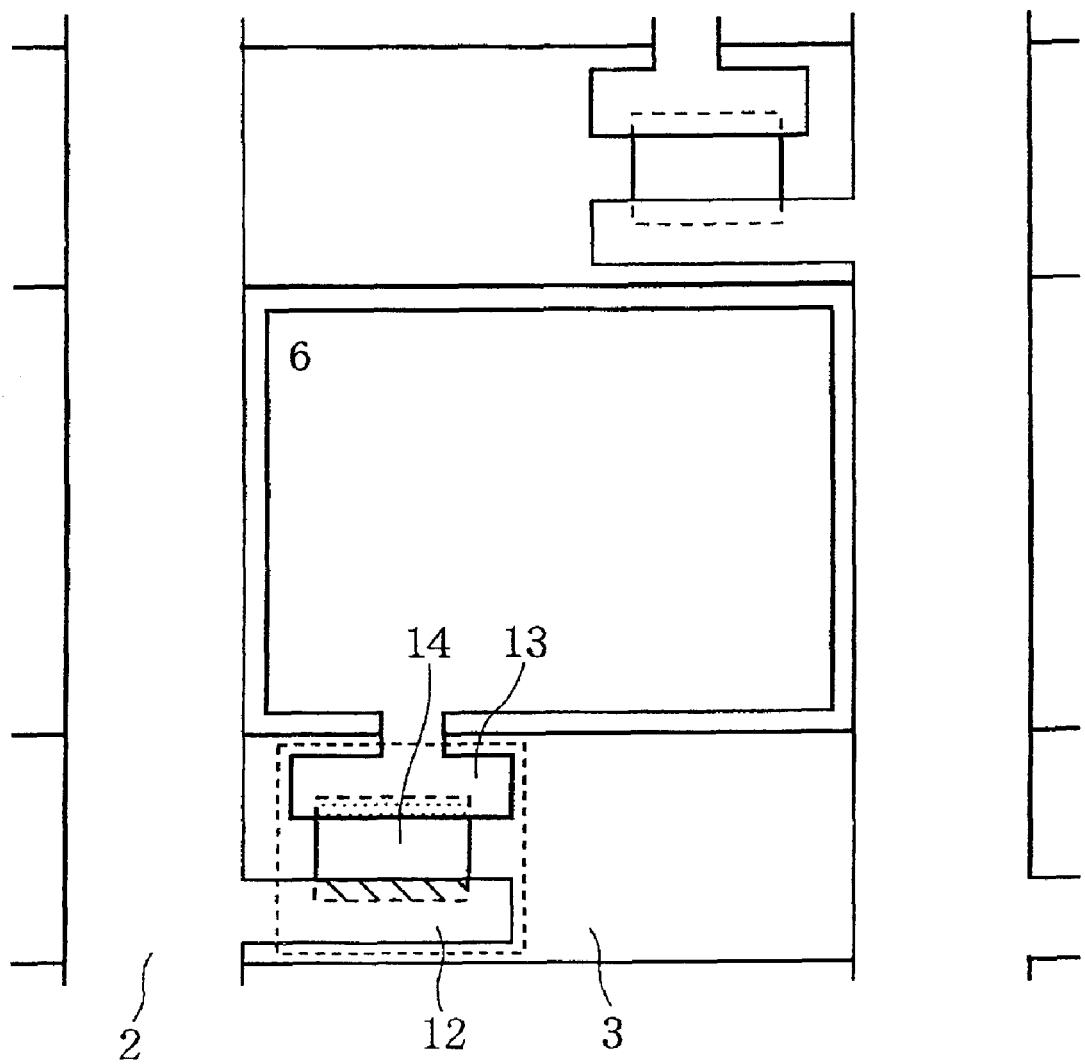
FIG. 12 is a plan view showing the arrangement of TFTs on a liquid crystal panel according to a fifth embodiment of the present invention.

FIG. 12 shows the present embodiment. The TFT 1 formed within the pixel in the first embodiment shown in FIG. 8 (FIG. 1) is placed outside the scan signal line 3. Even if a TFT is formed on a scan line as in the present embodiment, the source and drain electrodes of the TFT can be arranged along the image signal lines in the order as shown in the first embodiment. This achieves the same effects as described in the first embodiment. The arrangement also allows the designing of a pixel having a large area and bright display by increasing the aperture ratio of the liquid crystal display panel.

It is also possible to place the TFT on the scan signal line in the other embodiments. Even if the placement is applied to the other embodiments, the charging abilities of the TFTs have no difference therebetween irrespective of an alignment shift and uniform display can be performed. In addition, the increased aperture ratio provides bright display.

(Embodiment 6)

The present embodiment relates to a liquid crystal panel in a transverse electric field mode.

Figure 13:
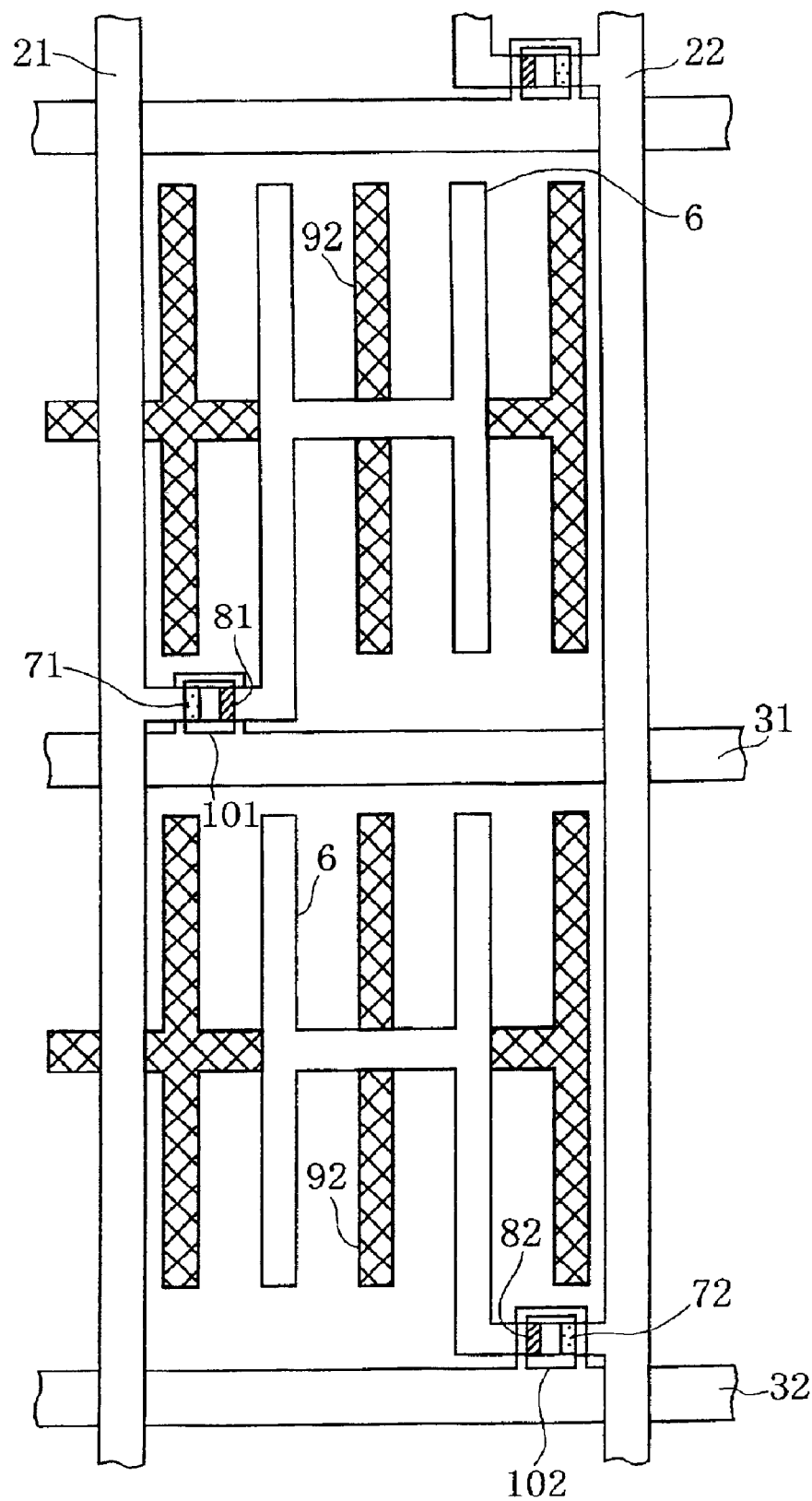
FIG. 13 shows the arrangement of TFTs on a liquid crystal panel in a transverse electric field mode as a sixth embodiment of the present invention.

Each of the foregoing embodiment has described the case where the pixel electrodes and the common electrode opposed to the pixel electrodes are formed on the different substrates. However, the same effects are achievable with a liquid crystal display panel in a transverse electric field mode such as an IPS (In-Plane Switching) mode in which the pixel electrodes and the common electrode are formed on a single substrate as shown in FIG. 13, in an FFS mode, or in an HS mode.

The present embodiment will be described briefly with reference to FIG. 13. In FIG. 13 is shown a view obtained by viewing the liquid crystal panel from above. The source electrodes 71 and 72 of the TFTs 101 and 102 of the upper and lower two electrodes are connected to the adjacent image signal lines 71 and 72, similarly to FIG. 8. In the drawing, 92 denotes a common electrode formed on a single (opposite to the user side and lower) substrate and 6 denotes each of pixel electrodes which are connected to the drain electrode 81 and 82 of the TFTs 101 and 102.

As for the description of the principle and mechanism of a liquid crystal in the transverse electric field mode, FFS mode, HS mode, or the like, the description thereof is omitted since it is so-called well-known technology.

(Embodiment 7)

The present embodiment uses channel-etched TFTs.

Figure 14:
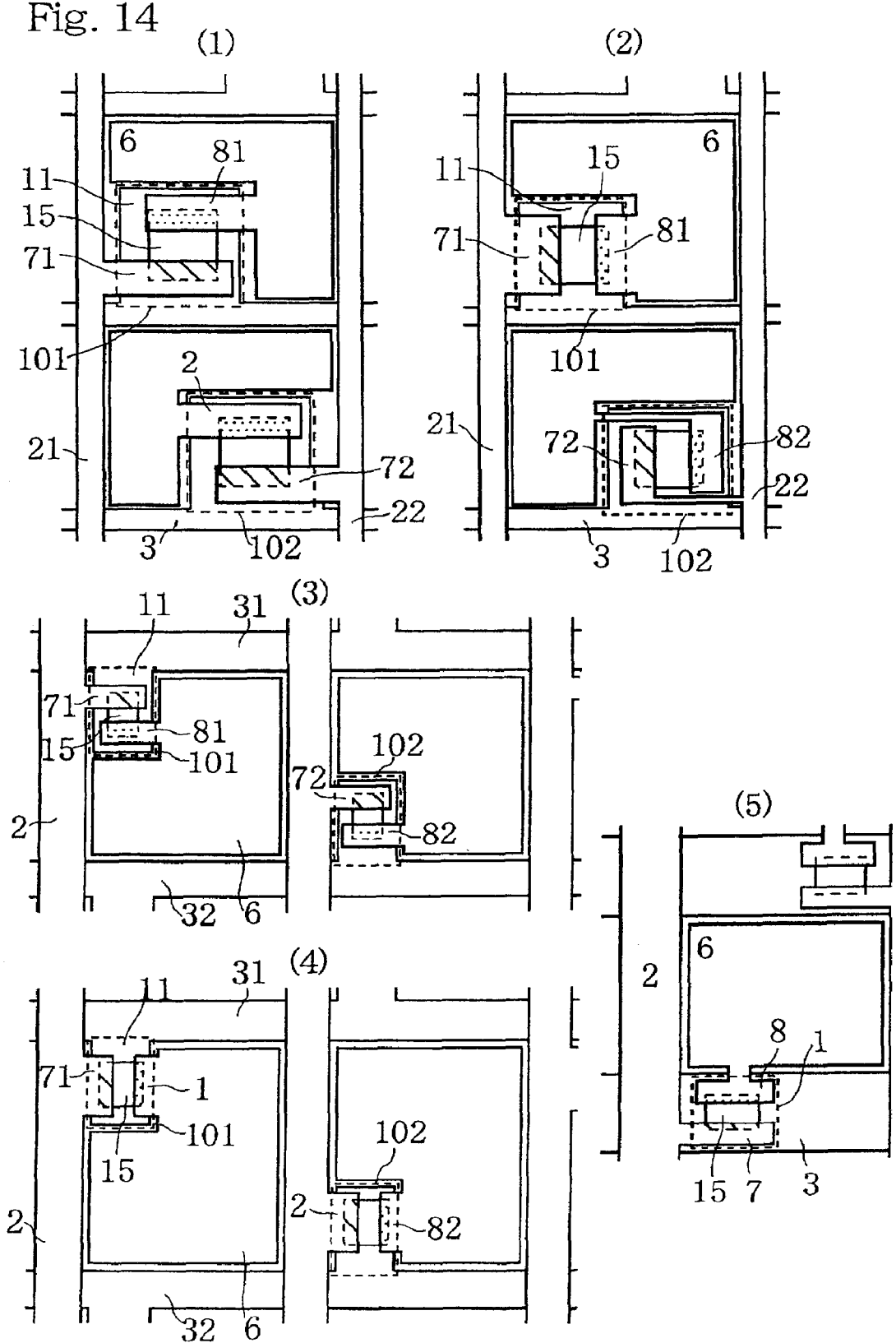
FIG. 14 includes plan views of various liquid crystal panels each using a channel-etched TFT as a seventh embodiment of the present invention.

Although each of the foregoing embodiments has described the case of using the channel-protected TFTs, the present invention is not limited thereto. The channel-etched TFTs may also be used in the FFS, HS, or other mode. In (1) to (5) of FIG. 14. are shown cases where the channel-etched TFTs are used. Those shown in (1) to (5) of FIG. 14 correspond to FIGS. 8 to 12 and have the semiconductor layer 15 patterned instead of using the channel protective film.

In the arrangement of the TFTs of the present invention also, the areas occupied by the overlapping portions between the semiconductor layers 15 and the source and drain electrodes 71, 72, 81, and 82 are no more different from one pixel to another even in the case of using the channel-etched TFTs, similarly to the case of using the channel-protected TFTs. This allows excellent image display.

(Embodiment 8)

The present embodiment relates to so-called U-shaped TFTs in each of which the number of at least one of the source and drain electrodes is plural.

In FIGS. 15 to 20 are shown the arrangements of image signal lines, pixel signal lines, and the source, drain, and gate electrodes of adjacent two TFTs of the present embodiment which are paired up in the longitudinal or lateral directions or the overlapping relations among portions related to the capacitances of the TFTs when viewed from above the substrate.

Figure 15:
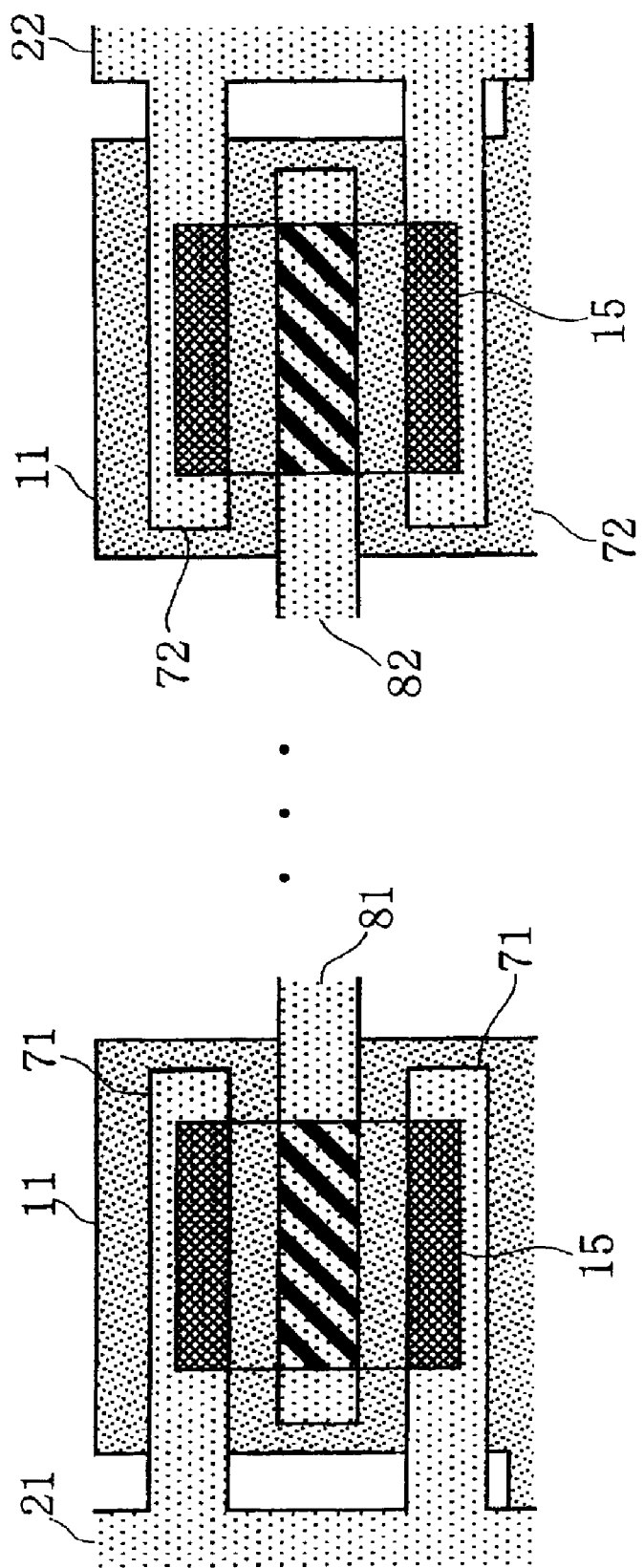
FIG. 15 is a view showing 1 of an eighth embodiment of the present invention.
Figure 16:
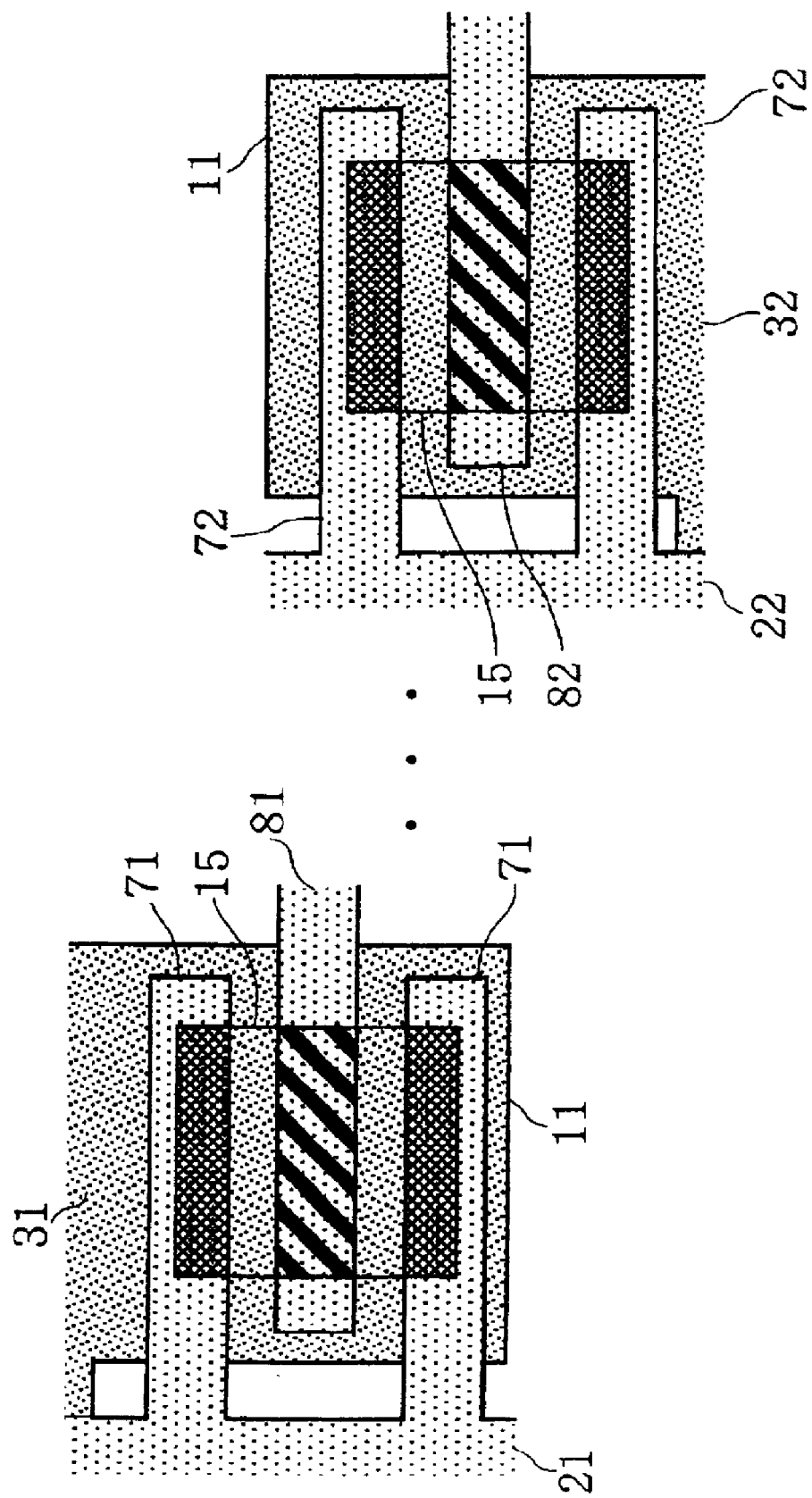
FIG. 16 is a view showing 1 of the eighth embodiment.

In FIG. 15, the two TFTs arranged laterally between the adjacent two image signal lines have source electrodes connected to the different image signal lines. In FIG. 16, the two TFTs arranged longitudinally between the adjacent two scan signal lines have gate electrodes connected to the different scan signal lines. Each of the TFTs shown in FIG. 15 which have the respective source electrodes connected to the different scan signal lines between the adjacent two image signals lines is provided with two source electrodes 7. Each of the TFTs shown in FIG. 16 which have the respective gate electrodes connected to the different scan signal lines between the adjacent two scan signal lines is provided with two source electrodes 7. The two electrodes 7 have the drain electrode 8 interposed midway therebetween. As a result, it is no more necessary to select between landscape and portrait orientations.

It will be appreciated that, in each of FIGS. 15 and 16, the number of the source electrodes and that of the drain electrodes are interchangeable and the positional relationship between the source and drain electrodes is reversible. Although 15 denotes the semiconductor layer of the channel-etched TFT in FIG. 16 and the like, 15 denotes a channel protective film if a channel-protected TFT is used instead.

In each of FIGS. 17 to 20, two source electrodes and two drain electrodes are provided and arranged equidistantly in the lateral or longitudinal direction. The semiconductor layer or the overlying insulating film 14 is configured as an elongated square so that the areas of overlapping portions with the source and drain electrodes do not change even if a slight alignment shift occurs in the direction of the shorter sides (lateral direction) of the semiconductor layer or the insulating film 14. The shorter side portions of the semiconductor layer or the insulating film 14 in the longitudinal or lateral direction extend to a region near the center portions of the source or drain electrodes which are also elongated in the lateral or longitudinal direction so that the characteristics of the two TFTs do not vary or vary equally even if a slight alignment shift occurs in the direction of the longer sides (longitudinal direction).

Although one TFT has two source electrodes and two drain electrodes at the maximum in the present embodiment, it will be understood that a larger number of source and drain electrodes may also be provided. In this case, it will also be understood that the source and drain electrodes need not necessarily be arranged equidistantly or alternately except for the electrodes at the ends.

Figure 18:
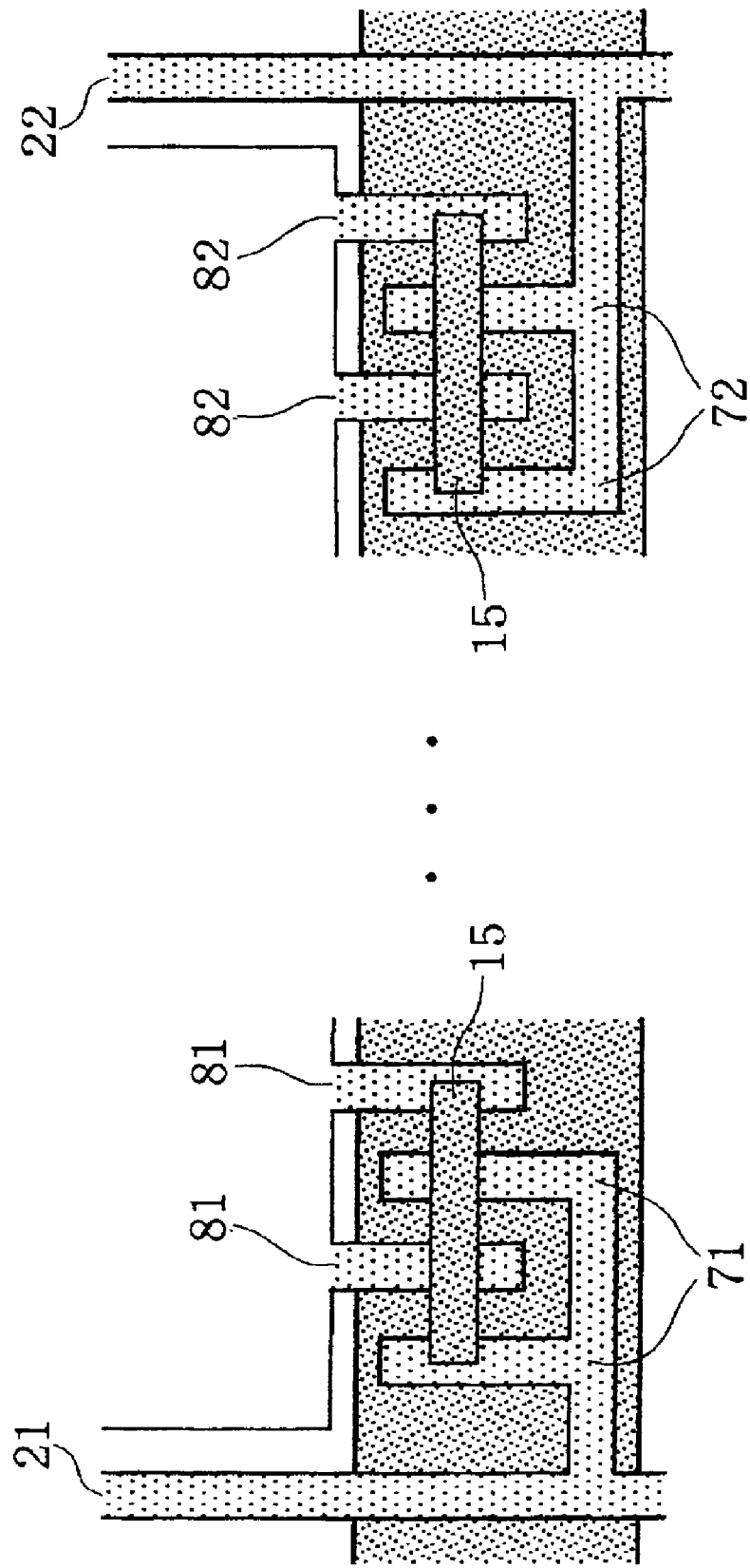
FIG. 18 is a view showing 1 of the eighth embodiment.

In FIGS. 17 and 18, the respective source electrodes of the two TFTs arranged laterally are connected to the different source lines. In FIGS. 19 and 20, the respective gate electrodes of the two TFTs arranged longitudinally are connected to different gate lines. However, the description of the arrangements will be omitted for the prevention of redundancy.

(Embodiment 9)

The present embodiment will describe the case where each of the TFTs has an L-shaped configuration.

Figure 21:
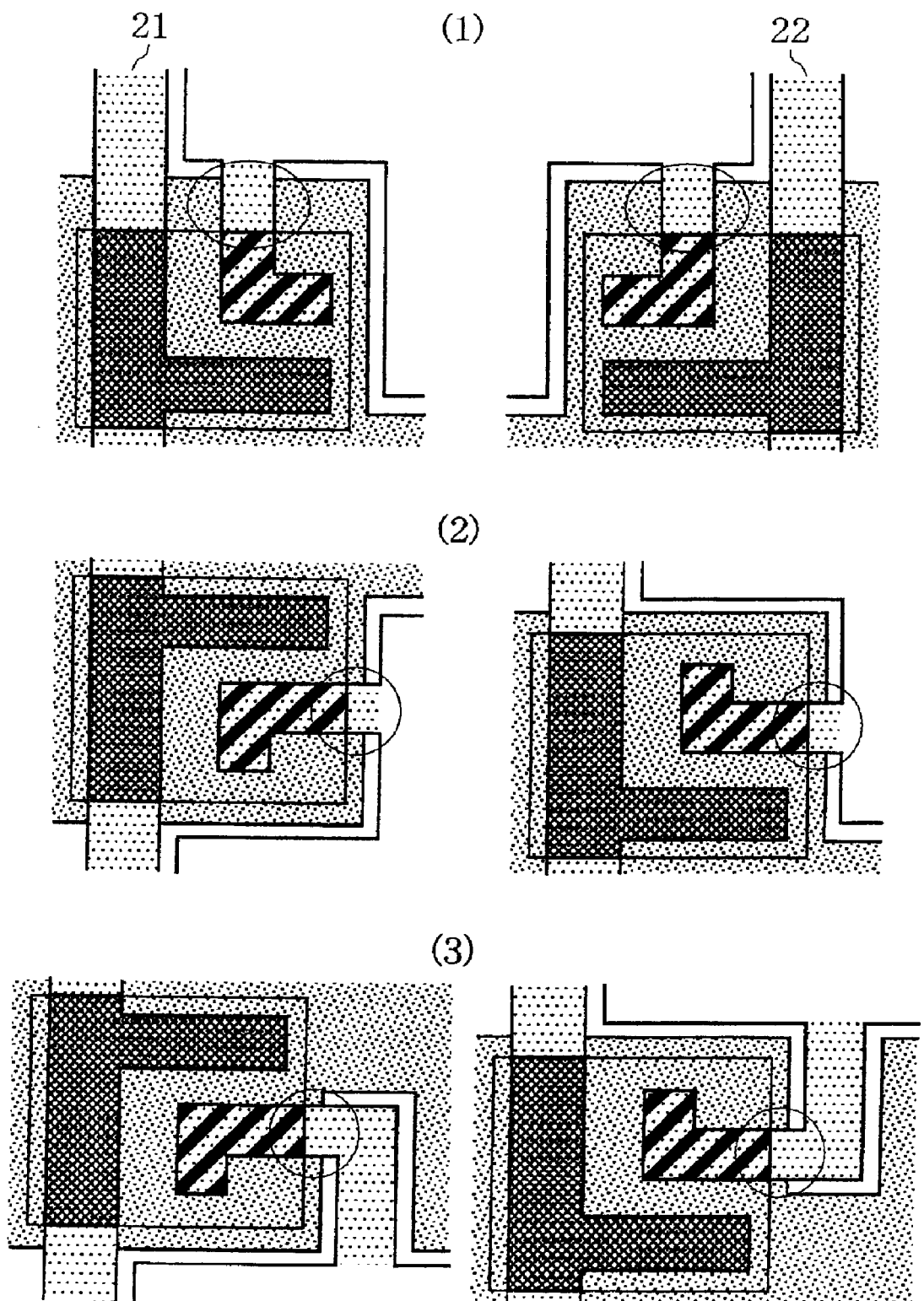
FIG. 21 is a view showing 1 of a ninth embodiment of the present invention.

FIG. 21 shows several examples of the arrangement of a pair of TFTs arranged longitudinally or laterally according to the present embodiment. As can be seen from the drawing, each of the two TFTs arranged longitudinally or laterally has an L-shaped drain electrode 8 and the source electrodes thereof are connected to the different and adjacent image signal lines in the present embodiment. A semiconductor layer 14 having a rectangular plan configuration completely overlaps the L-shaped portion of the drain electrode 8 and the source electrode 7.

In (1) of FIG. 21 is shown the case where the two TFTs are arranged laterally. In (2) of FIG. 21 is shown the case where the two TFTs are arranged longitudinally. In (3) of FIG. 21 is shown the case where the TFTs are formed on the gates. In any of (1), (2), and (3) of FIG. 21, the areas of the encircled portions which ought to have been related to capacitance conventionally or the overlapping areas of the encircled portions are constant irrespective of an alignment shift.

(Embodiment 10)

The present embodiment relates to diodes.

Figure 22:
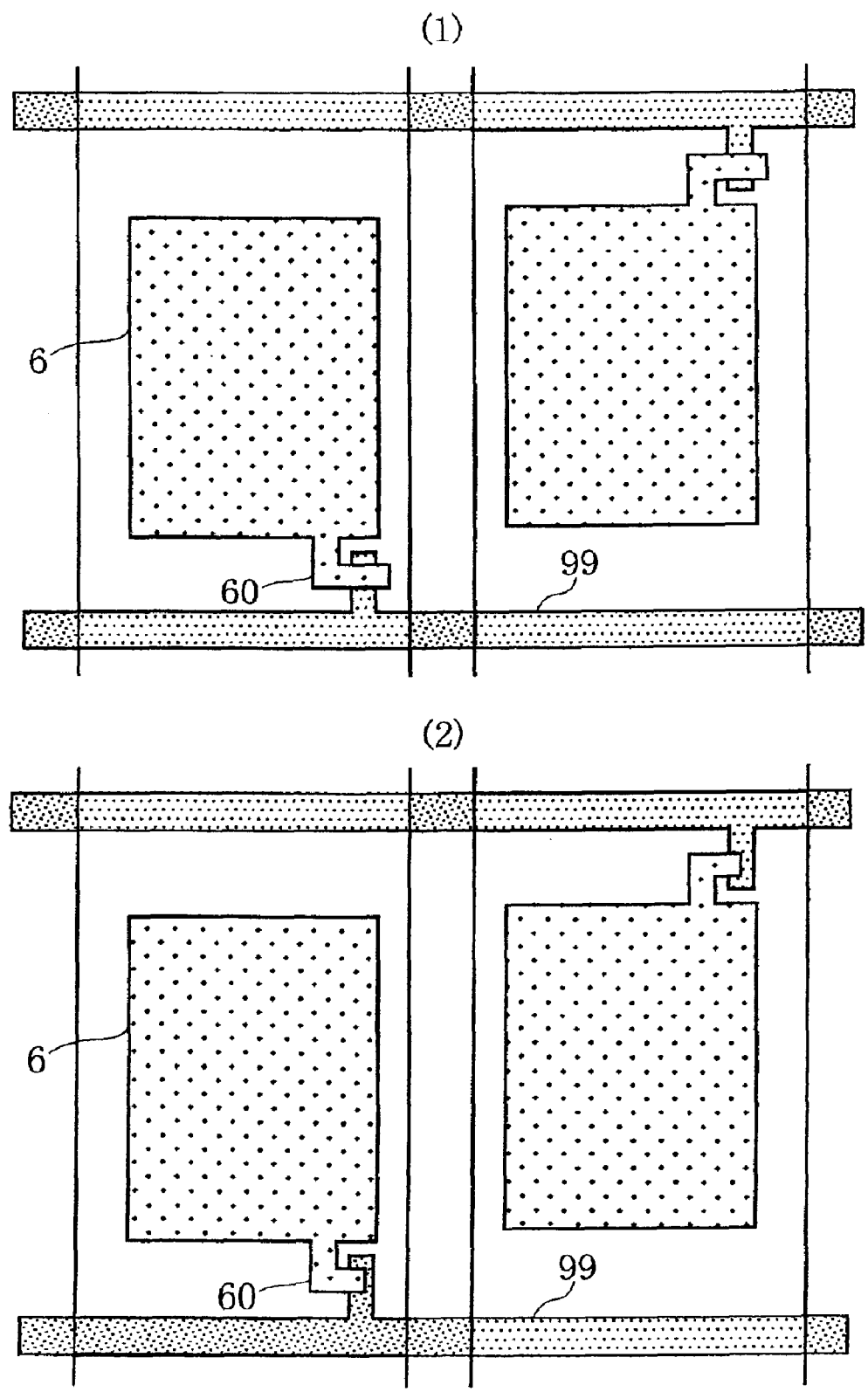
FIG. 22 is a circuit diagram of a liquid crystal display panel according to each of eleventh and twelfth embodiments of the present invention.

The present embodiment is shown in (2) of FIG. 22.

For the reasons described above, an alignment shift produces a capacitance difference between the diodes in the arrangement of the TFTs shown in (1) of FIG. 22. However, the arrangement of the TFTs as shown in (2) of FIG. 22 has higher resistance to an alignment shift since the capacitances of the diodes are irrelevant to a longitudinal shift and change equally in response to a lateral shift.

(Embodiment 11)

The present embodiment relates to a method for driving each of the liquid crystal display panels described in the first and second embodiments.

Figure 3:
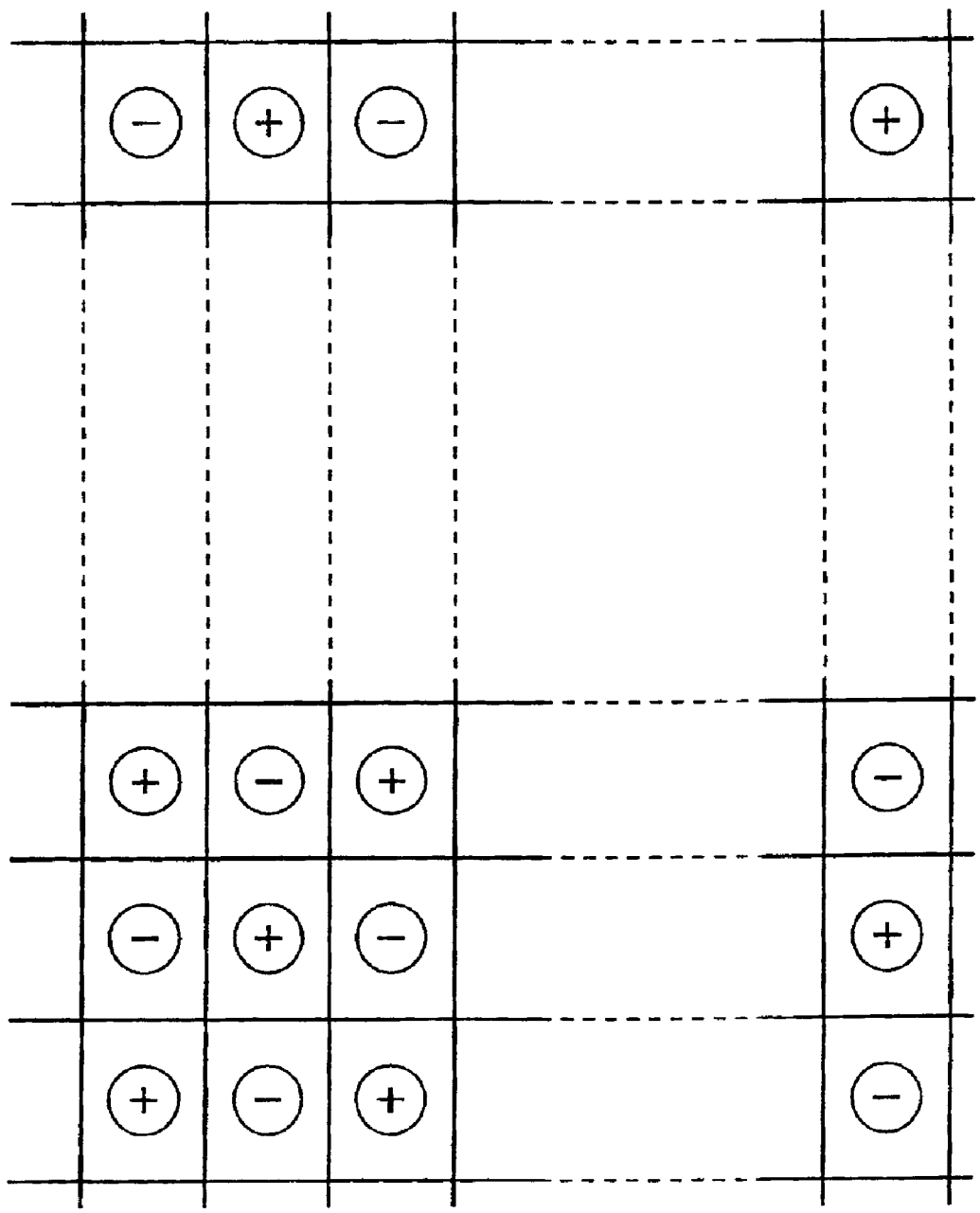
FIG. 3 is a view showing the polarities of charge in individual pixels in dot inversion driving.
Figure 23:
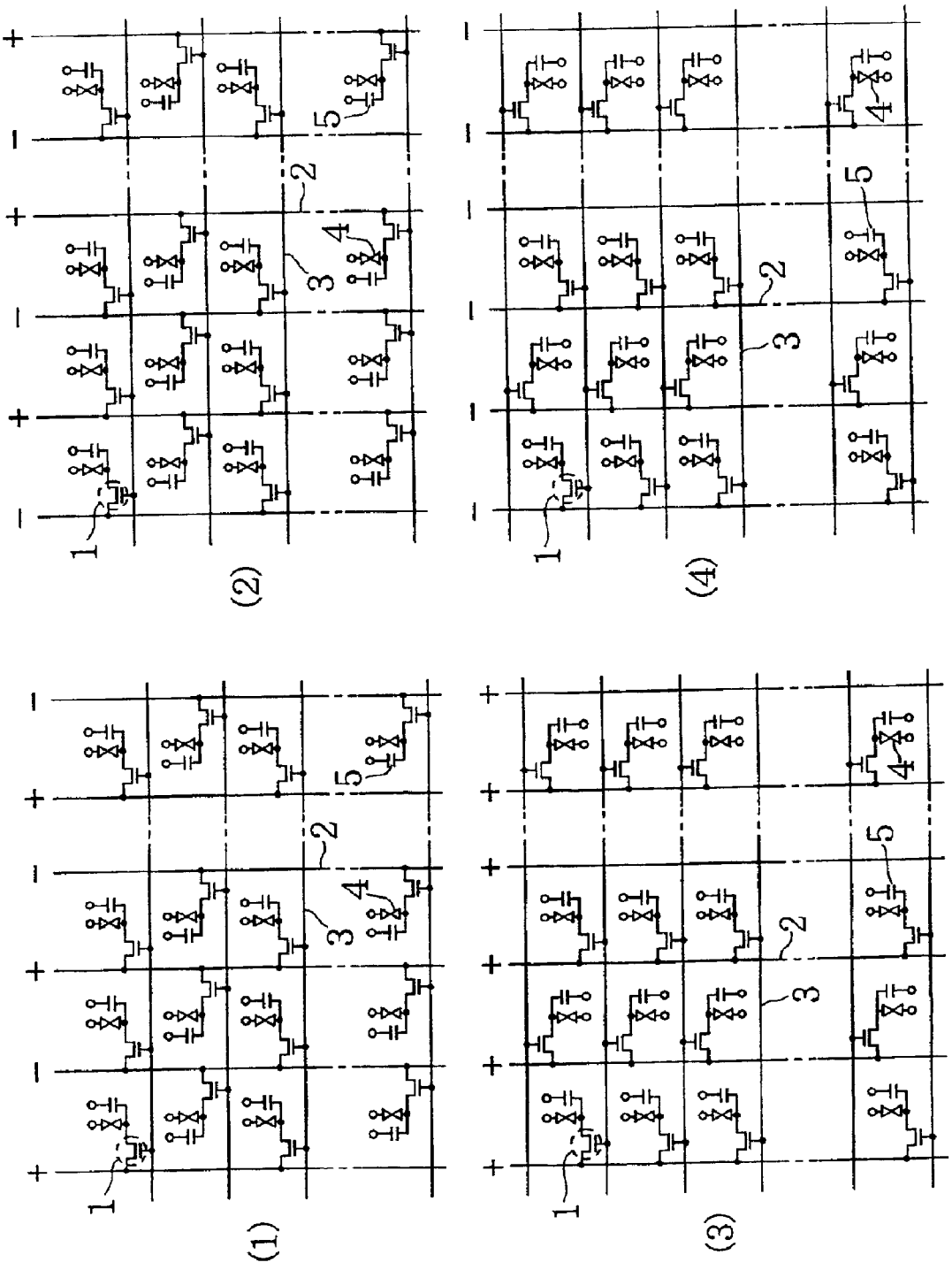
FIG. 23 is a view showing the impression of a voltage in the foregoing two embodiments.

In (1) and (2) of FIG. 23 is shown a circuit of the present embodiment. By inverting the polarities of image signal voltages impressed on the image signal lines 2 arranged on the liquid crystal display panel such that the positive and negative polarities alternate along scan signal lines 3 as shown in (1) of FIG. 23, the voltages of different polarities are reliably written in the adjacent two pixels. This provides a liquid crystal display panel as shown in FIG. 3 so that pseudo inversion driving is performed.

The polarities of the signals applied to the image signal lines 2 may be such that the negative and positive polarities alternate along the scan signal lines 3, as shown in (2) of FIG. 23.

In each of the embodiments, the polarities of the image signal voltages impressed on the image signal lines 2 are inverted on a per frame basis such that ac voltages are impressed on pixels and the two signal patterns shown in (1) and (2) of FIG. 23 are switched on a per frame basis. As a result, the image signal voltages written in the two pixels which are adjacent in the longitudinal or lateral direction of the liquid crystal display panel have different polarities and an ac voltage having a polarity inverted on a per frame basis is impressed on each of the pixels. This enables dot inversion display free from non-uniform brightness and flicker which does not deteriorate under the influence of DC voltage.

Figure 24:
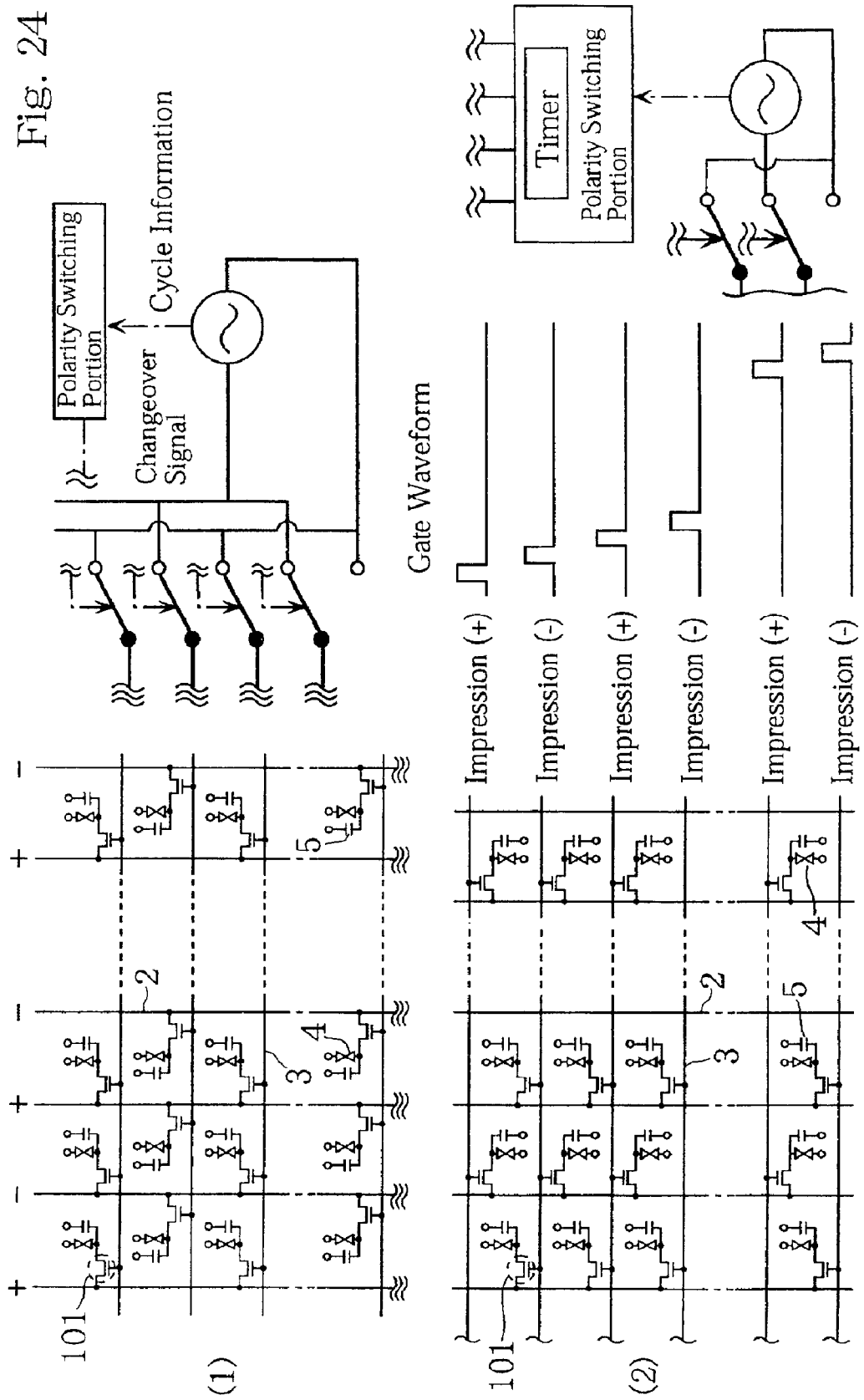
FIG. 24 is a view conceptually showing the principle of the impression of the voltage on a signal line in pseudo dot conversion.

A circuit configuration in which the polarity of each pixel is inverted on a per display period basis or on a per predetermined-number-of-display-periods basis is well-known and easy technique. The same shall apply to the case of pseudo dot inversion (in the simplest manner, the positive and negative switches of each of the image signal lines, the scan signal lines, and the like are switched appropriately on a per display period basis). Therefore, the description of the circuit and the like will be omitted. For reference purposes, a circuit for positive and negative impression in the eleventh and twelfth embodiments is conceptually shown in FIG. 24. Although information on an image is also inputted to a polarity switching portion on a per pixel basis in practical use, it is not depicted for the prevention of intricacy.

(Embodiment 12)

The present embodiment relates to a method for driving each of the liquid crystal display panels in the foregoing third and fourth embodiments.

In (3) and (4) of FIG. 23 is shown a circuit of the present embodiment.

The polarities of the image signal voltages impressed on the image signal lines 2 are alternately switched as shown in (3) of FIG. 23 during a horizontal scan period during which a certain scan line is scanned, in (4) of FIG. 23 during another horizontal scan period during which the subsequent scan line is scanned, and in (3) of FIG. 23 during a still another horizontal scan period during which the subsequent scan line is scanned (the polarities of the image signal voltages are inverted on a per horizontal-scan-period basis such that positive and negative polarities alternate). As a result, voltages of different polarities are written reliably in the adjacent two pixels in the liquid crystal display panel as shown in FIG. 3 so that pseudo dot inversion driving is performed.

(Embodiment 13)

The present embodiment relates to an improvement in color display characteristics in pseudo dot inversion display. If the arrangement of three primary colors on a color display panel is in a mosaic pattern, the primary colors of red (R), green (G), and blue (B) are repeatedly arranged in this order in oblique directions so that, if red is used as an example, lines in positive (+) display and lines in negative (−) display are arranged alternately. This causes a problem if the color display panel is used by those particular with color or for professional purposes. In the arrangement in stripes, however, the positive and negative displays are repeated on a per pixel basis in a longitudinal (or lateral) red stripe and the repetition of the positive and negative displays is shifted by one pixel position in an adjacent red stripe disposed three lines apart. This achieves more preferable red display.

Figure 25:
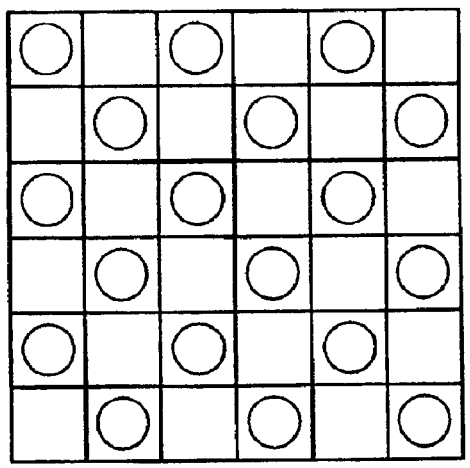
FIG. 25 is a view showing technology according to a thirteenth embodiment of the present invention.

The technology is shown in FIG. 25. In (1) of FIG. 25 is shown the distribution of the positive and negative polarities of the individual pixels in pseudo dot conversion. The technology is basically the same as shown in FIG. 3 so that ○ represents the positive or negative polarity and the polarity of each of the pixels is inverted on a per display period basis. In (2) of FIG. 25 is shown the placement of the positive and negative polarities of red pixels which are arranged in a mosaic pattern. In this case, the groups of red pixels of the positive polarities and the groups of red pixels of the negative polarities are arranged alternately in oblique directions as shown on the right side of (2) of FIG. 25. Likewise, the case of longitudinal stripes is shown in (3) of FIG. 25.

(Embodiment 14)

The present embodiment relates to the case of liquid crystal logic elements.

Figure 26:
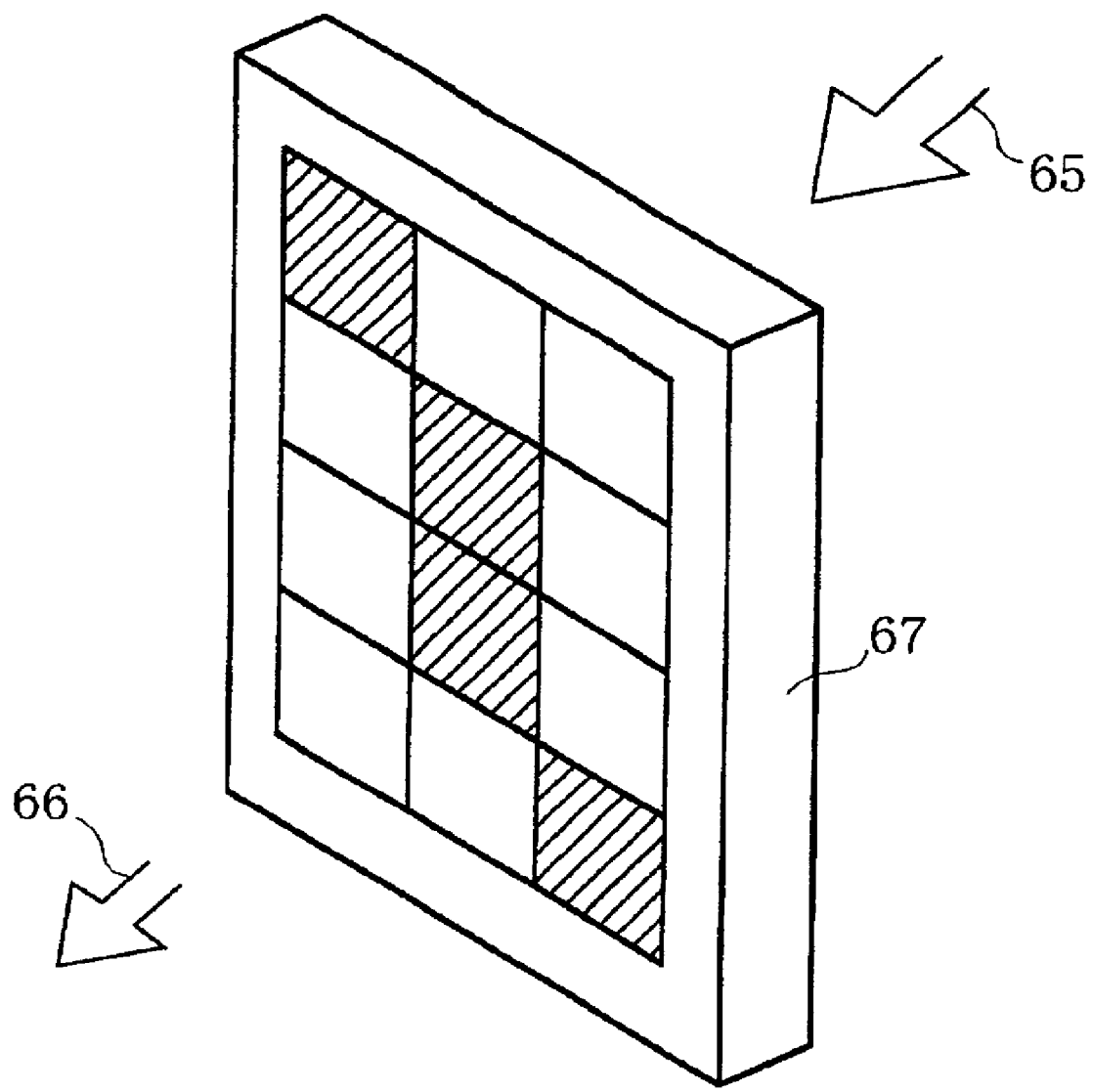
FIG. 26 is a view showing an optical logic element as a fourteenth embodiment of the present invention.

In recent years, an optical logic element 67 for outputting, as transmitted light 66, the result of an arithmetic operation performed with respect to incident light 65 has been developed, as shown in FIG. 26. In an application to an optical computer, the optical logic element is required to have high reliability and performance. In this case also, high reliability and performance satisfying the requirements has been obtained by combining the technologies described in the foregoing embodiments.

Although the present invention has been described based on some of the embodiments thereof, it will be appreciated that the present invention is not limited thereto. The following arrangements are also possible.

(1) Other types of liquid crystal materials and semiconductor materials may be used. For example, Si—C—Ge or Si—Ge may be used as a semiconductor material.

(2) The sizes of semiconductor elements and pixels are not limited.

(3) So long as a liquid crystal and a TFT or diode are used, a liquid crystal shutter is used in a product or object other than a liquid crystal device or a liquid crystal optical logic element, such as goggles, and a liquid crystal focusing mechanism is used in a camera.

(4) A pixel may have another configuration of another size, such as a rectangle which is about 50 μm in size. A TFT may also have another configuration of another size, which is about 10 μm long in the channel direction.

(5) The liquid crystal device may be of reflection type or reflection/transmission dual-purpose type.

INDUSTRIAL APPLICABILITY

As can be understood from the foregoing description, the present invention eliminates, in an active matrix liquid crystal display panel using thin-film transistors as switching elements, a performance difference between the thin-film transistors for individual pixels in the panel which is produced under manufacturing constraints when pseudo dot inversion driving is performed. This allows excellent images to be displayed on the liquid crystal display panel.

The present invention also contributes to more excellent color display.

What is claimed is:

1. A liquid crystal device comprising a plurality of scan signal lines and a plurality of image signal lines located orthogonally on a substrate and having thin-film transistors located in sections enclosed by the scan signal lines and the image signal lines, each of the thin-film transistors for operating as a switching element corresponding to one of the sections and controlling transmission of light by a semiconductor layer, the liquid crystal device comprising the signal lines and the thin-film transistors for performing a pseudo dot inversion which changes the polarity of a pixel on a per image-signal-line basis, wherein:

two of the thin-film transistors located between an adjacent two of the image signal lines have respective source electrodes connected to different image signal lines and respective drain electrodes connected to respective pixel electrodes; and the respective gate, source, and drain electrodes of the two thin-film transistors are alignment-shift-compensated electrodes having configurations and structures for causing at least one of a capacitance between the gate and drain electrodes and a capacitance between the gate and source electrodes to be constant or to vary equally in each of the two transistors.

2. The liquid crystal device of claim 1, wherein each of the two thin film transistors is an overlapping-area-compensated thin-film transistor comprising means for compensating for at least one of a variation in the capacitance between the gate and drain electrodes and a variation in the capacitance between the gate and source electrodes caused by the alignment shift such that at least one of a variation in an overlapping area between the gate and drain electrodes and a variation in an overlapping area between the gate and source electrodes responsive to the alignment shift is constant or equal.

3. The liquid crystal device of claim 1, wherein each of the two thin film transistors is an overlapping-area-compensated thin-film transistor comprising means for compensating for at least one of a variation in the capacitance between the gate and drain electrodes and a variation in the capacitance between the gate and source electrodes caused by the alignment shift such that at least one of a variation in an overlapping area between a channel protective film and the drain electrode and a variation in an overlapping area between the channel protective film and the source electrode responsive to the alignment shift is constant or equal.

4. The liquid crystal device of claim 1, wherein, if the source and drain electrodes of the first one of the two thin-film transistors connected to the first one of the image signal lines are S1 and D1 and the source and drain electrodes of the second one of the two thin-film transistors connected to the second one of the image signal lines are S2 and D2, the four electrodes are arranged along the image signal lines in the order of S1, D1, S2, and D2 or D1, S1, D2, and S2.

* * * * *